(12) United States Patent
Huang et al.

(10) Patent No.: US 12,689,088 B2
(45) Date of Patent: Jul. 21, 2026

(54) ENERGY STORAGE POWER SUPPLY

(71) Applicant: SHENZHEN HELLO TECH ENERGY CO., LTD, Shenzhen (CN)

(72) Inventors: Shuisheng Huang, Shenzhen (CN); Zhongwei Sun, Shenzhen (CN); Gaosong Shen, Shenzhen (CN); Yongjun Chen, Shenzhen (CN)

(73) Assignee: SHENZHEN HELLO TECH ENERGY CO., LTD, Shenzhen (CN)

( * ) Notice: Subject to any disclaimer, the term of this patent is extended or adjusted under 35 U.S.C. 154(b) by 76 days.

(21) Appl. No.: 18/675,180

(22) Filed: May 28, 2024

(65) Prior Publication Data

US 2024/0429535 A1     Dec. 26, 2024

(30) Foreign Application Priority Data

Jun. 20, 2023   (CN) .......................... 202310738695.2
Jun. 20, 2023   (CN) ......................... 202321597643.X
(Continued)

(51) Int. Cl.
*H01M 50/264*          (2021.01)
*H01M 50/209*          (2021.01)
(Continued)

(52) U.S. Cl.
CPC ....... *H01M 50/264* (2021.01); *H01M 50/209* (2021.01); *H01M 50/211* (2021.01);
(Continued)

(58) Field of Classification Search
CPC ............. H01M 50/264; H01M 50/209; H01M 50/211; H01M 50/213; H01M 50/291;
(Continued)

(56) References Cited

U.S. PATENT DOCUMENTS 3,056,850 A * 10/1962 Rauske ............... H01M 50/213
                                                                429/157
9,685,682 B2 * 6/2017 Hoshi ............... H01M 10/4207
(Continued)

FOREIGN PATENT DOCUMENTS

CN        205069810 U        3/2016
CN        107134548 A        9/2017
(Continued)

OTHER PUBLICATIONS

Grant Notice dated Oct. 14, 2024 received in corresponding patent family application No. CN202420281877.1. English translation attached.

(Continued)

*Primary Examiner* — Muhammad S Siddiquee

(57)               ABSTRACT

Provided is an energy storage power supply (100). The energy storage power supply (100) includes a first housing (10), a fixing colloid, at least one first cell (20). The first housing (10) has an accommodation chamber (11) defined inside the first housing (10). The accommodation chamber (11) is provided with a positioning portion (12) at a bottom of the accommodation chamber (11). The positioning portion (12) has a positioning groove (121). The at least one first cell (20) is partially accommodated in the positioning groove. The fixing colloid is located in the positioning groove (121) and fixedly connected to the at least one cell (20) and a side wall of the positioning groove (121).

7 Claims, 15 Drawing Sheets

(30) Foreign Application Priority Data

Feb. 4, 2024 (CN) .......................... 202410160594.6
Feb. 4, 2024 (CN) .......................... 202420281888.X

(51) Int. Cl.

| | |
|---|---|
| H01M 50/211 | (2021.01) |
| H01M 50/213 | (2021.01) |
| H01M 50/291 | (2021.01) |
| H01M 50/507 | (2021.01) |
| H01M 50/55 | (2021.01) |

(52) U.S. Cl.

CPC ....... *H01M 50/213* (2021.01); *H01M 50/291* (2021.01); *H01M 50/507* (2021.01); *H01M 50/55* (2021.01)

(58) Field of Classification Search

CPC .. H01M 50/507; H01M 50/55; H01M 50/503; Y02E 60/10

See application file for complete search history.

(56) References Cited

U.S. PATENT DOCUMENTS

| | | | | |
|---|---|---|---|---|
| 11,283,118 | B2 * | 3/2022 | Yoo | H01M 10/613 |
| 11,870,048 | B2 | 1/2024 | Fröhlich et al. | |
| 12,431,591 | B2 * | 9/2025 | An | B23K 15/008 |
| 2008/0088276 | A1 | 4/2008 | Hurst et al. | |
| 2011/0014501 | A1 | 1/2011 | Scheucher | |
| 2011/0076521 | A1 | 3/2011 | Shimizu et al. | |
| 2011/0090614 | A1 * | 4/2011 | Guerin | H01G 2/08 |
| | | | | 361/274.3 |
| 2013/0164567 | A1 | 6/2013 | Olsson et al. | |
| 2013/0183566 | A1 * | 7/2013 | Wayne | H01M 10/643 |
| | | | | 429/120 |
| 2014/0248519 | A1 * | 9/2014 | Nishikawa | H01M 50/24 |
| | | | | 429/99 |
| 2016/0093926 | A1 | 3/2016 | Wright | |
| 2017/0244074 | A1 * | 8/2017 | Matsui | H01M 50/213 |
| 2018/0248229 | A1 | 8/2018 | Wada et al. | |
| 2018/0277802 | A1 | 9/2018 | Sun et al. | |
| 2019/0027731 | A1 * | 1/2019 | Zeng | H01M 50/51 |
| 2020/0227698 | A1 * | 7/2020 | Muratsu | H01M 50/583 |
| 2020/0243814 | A1 | 7/2020 | Kang et al. | |
| 2021/0083506 | A1 | 3/2021 | Rao et al. | |
| 2022/0109211 | A1 * | 4/2022 | Wang | H01M 50/249 |
| 2022/0376361 | A1 * | 11/2022 | An | H01M 50/505 |
| 2023/0207923 | A1 * | 6/2023 | Kawata | H01M 50/289 |
| | | | | 429/120 |

FOREIGN PATENT DOCUMENTS

| | | | |
|---|---|---|---|
| CN | 207368039 | U | 5/2018 |
| CN | 212587564 | U | 2/2021 |
| CN | 112531275 | A | 3/2021 |
| CN | 214254570 | U | 9/2021 |
| CN | 214542391 | U | 10/2021 |
| CN | 116742280 | A | 9/2023 |
| CN | 116759736 | A | 9/2023 |
| JP | H09306447 | A | 11/1997 |
| JP | 2008293863 | A | 12/2008 |
| JP | 201176936 | A | 4/2011 |
| JP | 2012212628 | A | 11/2012 |
| JP | 201370535 | A | 4/2013 |
| JP | 2013525942 | A | 6/2013 |
| JP | 2014197516 | A | 10/2014 |
| JP | 2018125192 | A | 8/2018 |
| JP | 2018170254 | A | 11/2018 |
| JP | 2021136054 | A | 9/2021 |

| | | | |
|---|---|---|---|
| RU | 2789348 | C2 | 2/2023 |
| TW | M443943 | U * | 12/2012 |
| WO | 2009118963 | A1 | 10/2009 |
| WO | 2013129074 | A1 | 9/2013 |
| WO | 2022069910 | A1 | 4/2022 |
| WO | 2022120140 | A2 | 6/2022 |

OTHER PUBLICATIONS

Notice of Reasons for Refusal dated Dec. 10, 2024 received in corresponding patent family application No. JP2024-092722. English translation attached.

Grant Notice dated Aug. 20, 2025 received in corresponding patent family application No. CN202422612323.8. English translation attached.

International Search Report dated May 28, 2024 in International Application No. PCT/CN2024/084162. English translation attached.

First Office Action dated Jul. 2, 2024 received in corresponding patent family application No. JP2024-092722. English translation attached.

First Office Action dated Jul. 26, 2024 received in corresponding patent family application No. CN202420281877.1. English translation attached.

Second Office Action dated Sep. 11, 2024 received in corresponding patent family application No. CN202420281877.1. English translation attached.

Grant Notice dated Aug. 29, 2024 received in in corresponding patent family application No. CN202420281888.X. English translation attached.

Notice of Reasons for Refusal dated Dec. 5, 2024 received in corresponding patent family application No. JP2024-092722. English translation attached.

Written Opinion dated May 28, 2024 received in international Application No. PCT/CN2024/084162. English translation attached.

The Grant Notice from corresponding Chinese Application No. 202321597643.X, dated Jan. 25, 2024. English translation attached.

Notice of Reasons for Refusal dated Sep. 30, 2025 received in corresponding patent family application No. JP2024223628. English translation attached.

Notice of Reasons for Refusal dated Sep. 30, 2025 received in corresponding patent family application No. JP2025133186. English translation attached.

Non-Final Rejection dated Nov. 25, 2025 received in corresponding patent family U.S. Appl. No. 19/328,266.

Non-Final Rejection dated Dec. 9, 2025 received in corresponding patent family U.S. Appl. No. 19/328,272.

Flannery et al, Rechargeable Battery and Method for Manufacture of Rechargeable Battery, Feb. 2023, See the Abstract. (Year: 2023).

Guo, Energy storage module, Mar. 2021, See the Abstract. (Year: 2021).

Zhou, A battery pack, Sep. 2017, See the Abstract. (Year: 2017).

Non-Final Rejection dated Dec. 10, 2025 received in corresponding patent family U.S. Appl. No. 19/328,273.

Notice of Reasons for Refusal dated Mar. 3, 2026 received in corresponding patent family application No. JP2024223628. English translation attached.

Decision to Grant dated Mar. 3, 2026 received in corresponding patent family application No. JP2025133186. English translation attached.

Final Rejection dated Mar. 17, 2026 received in corresponding patent family U.S. Appl. No. 19/328,266.

Zhang et al, Easily Combinable Modularized Mobile Energy Storage inverter Power Supply, May 2023, See the Abstract. (Year: 2023).

Notice of Allowance dated Mar. 24, 2026 received in corresponding patent family U.S. Appl. No. 19/328,272.

Final Rejection dated Mar. 24, 2026 received in corresponding patent family U.S. Appl. No. 19/328,273.

* cited by examiner

ENERGY STORAGE POWER SUPPLY

CROSS-REFERENCE TO RELATED APPLICATION

The present application claims the benefit of priority of following Chinese Patent Applications:

1) Chinese Patent Application No. 202310738695.2 filed on Jun. 20, 2023;
2) Chinese Patent Application No. 202321597643.X filed on Jun. 20, 2023;
3) Chinese Patent Application No. 202410160594.6 filed on Feb. 4, 2024;
4) Chinese Patent Application No. 202420281888.X filed on Feb. 4, 2024, each of which is incorporated herein by reference in its entirety.

FIELD

The present disclosure relates to the technical field of energy storage, and more particularly, to an energy storage power supply.

BACKGROUND

In the related art, a battery pack includes a housing and a battery module fixed to the housing through screws, etc. The battery module is assembled from parts such as a cell, a cell support, a busbar, a collection plate, and a screw. During assembly of the battery pack, the battery module is first assembled using the parts, and then the battery module is fixed in the housing. However, such a battery pack has a number of related structural parts of different types, leading to a complex assembly process and high cost. Moreover, in order to reserve mounting space, a space utilization rate of the product is low, with a large overall product size.

SUMMARY

An energy storage power supply according to an embodiment of the present disclosure includes a first housing, a plurality of first cell, and a busbar. The plurality of first cell is arranged in the first housing. Each of the plurality of first cell includes two electrodes located at a same side of a respective first cell. The busbar is located at the same side of the respective first cell and electrically connected to the two electrodes to allow the plurality of first cells to be connected in parallel and/or in series.

An embodiment of the present disclosure provides an energy storage power supply. The energy storage power supply includes a second housing, at least one second cell, a fixing member, and an electrical connection member. The second housing is provided with a second positioning portion at an inner wall of the second housing. Each of the at least one second cell has a first end inserted into the second positioning portion and a second end opposite to the first end. Each of the at least one second cell is provided with two electrodes at the second end of a respective second cell of the at least one second cell. The fixing member is configured to fix the second end of each of the at least one second cell. The electrical connection member is electrically connected to the second end of each of the at least one second cell.

BRIEF DESCRIPTION OF THE DRAWINGS

These and other aspects and advantages of embodiments of the present disclosure will become apparent and more readily appreciated from the following descriptions made with reference to the accompanying drawings.

Figures 1, 2:
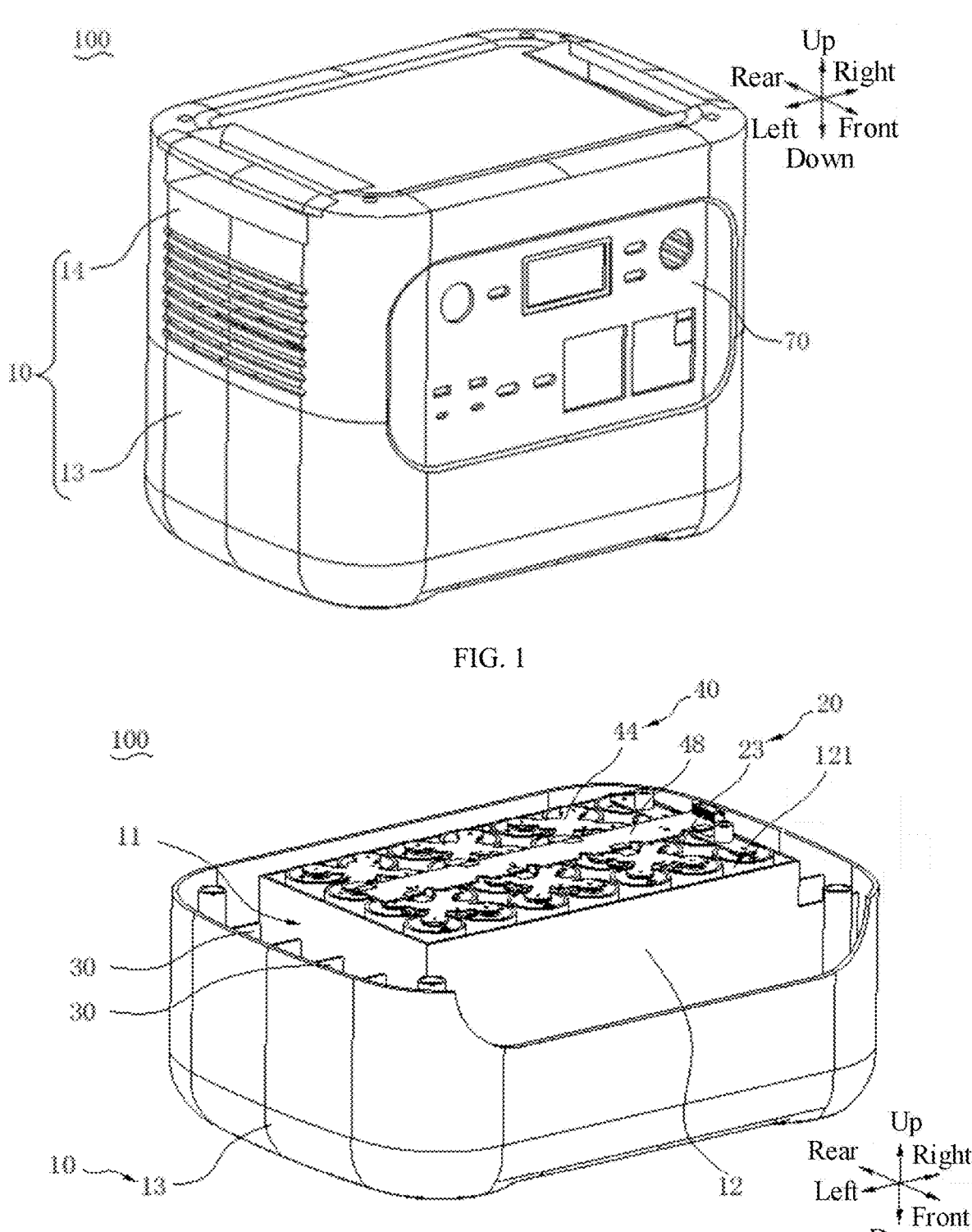
FIG. 1 is a schematic structural view of an energy storage power supply according to an embodiment of the present disclosure.
FIG. 2 is a schematic view of an internal structure of an energy storage power supply according to an embodiment of the present disclosure.

REFERENCE NUMERALS OF PRIMARY COMPONENTS energy storage power supply 100, first housing 10, accommodation chamber 11, first positioning portion 12, positioning groove 121, first casing 13, receiving groove 131, first through hole 132, second casing 14, first cell 20, soft-pack cell 21, prismatic cell 22, cylindrical cell 23, sheet-like cell 24, first pole 231, second pole 232, reinforcement rib 30, busbar 40, first busbar 41, second busbar 42, third busbar 43, fourth busbar 44, first collection plate 45, second collection plate 46, third collection plate 47, fourth collection plate 48, cover plate 50, sealing ring 60, panel 70, support 80; energy storage power supply 100, second casing 101, second cell 103, fixing member 15, electrical connection member 17, collection plate 19, inverter 201, battery management system 203, main board 25, front panel 27, handle 29, foot pad 31, second positioning portion 111, containing chamber 112, inner bottom wall 113, inner side wall 115, third casing 117, fourth casing 119, first end 1301, second end 1302, electrode 133, split-type support 151, screw 152, snap-fitting post 1131, position-limiting strip 1132, serpentine side surface 1133, one-piece support 1151, third pole 1331, fourth pole 1332, second through hole 1511.

DETAILED DESCRIPTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only and are intended to explain rather than limit the present disclosure.

Various embodiments or examples for implementing different structures of the present disclosure are provided below. In order to simplify the description of the present disclosure, components and arrangements of specific examples are described herein. These specific examples are merely for the purpose of illustration, rather than limiting the present disclosure. Further, the same reference numerals and/or reference letters may appear in different examples of the present disclosure for the purpose of simplicity and clarity, instead of indicating a relationship between different embodiments and/or the discussed arrangements. In addition, the present disclosure provides examples of various specific processes and materials. However, applications of other processes and/or the use of other materials are conceivable for those of ordinary skill in the art.

In addition, the term "first" or "second" is only for descriptive purposes, rather than indicating or implying relative importance or implicitly indicating the number of indicated technical features. Therefore, the features defined with "first" or "second" can explicitly or implicitly include at least one of the features. In the description of the present disclosure, "plurality of" means at least two, unless otherwise specifically indicated.

In the description of this specification, descriptions with reference to the terms "an embodiment", "some embodiments", "illustrative embodiments", "examples", "specific examples", or "some examples" etc., mean that specific features, structure, materials or characteristics described in conjunction with the embodiment or example are included in at least an embodiment or example of the present disclosure. In this specification, the schematic representations of the above terms do not necessarily refer to the same embodiment or example. Moreover, the described specific features, structures, materials, or characteristics may be combined in any one or more embodiments or examples in a suitable manner.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "counterclockwise", etc., are based on the orientation or position relationship shown in the drawings, and is only for the convenience of describing the present disclosure and simplifying the description, rather than indicating or implying that the associated device or element must have a specific orientation, or be constructed and operated in a specific orientation, and therefore cannot be understood as a limitation on the present disclosure.

In the present disclosure, unless otherwise clearly specified and limited, the first characteristic is "on" or "under" the second characteristic refers to the first characteristic and the second characteristic can be direct or via another characteristic indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, it should be noted that unless otherwise clearly specified and limited, terms such as "installed", "mounted", "connected", "coupled" should be understood in a broad sense. For example, it may be a fixed connection or a detachable connection or connection as one piece; mechanical connection or electrical connection; direct connection or indirect connection through an intermediate; internal communication of two components or the interaction relationship between two components. For those of ordinary skill in the art, the specific meaning of the above-mentioned terms in the present disclosure can be understood according to specific circumstances.

The present disclosure provides an energy storage power supply, which aims to solve at least one of the above problems.

An energy storage power supply according to an embodiment of the present disclosure includes a first housing, a plurality of first cell, and a busbar. The plurality of first cell is arranged in the first housing. Each of the plurality of first cell includes two electrodes located at a same side of a respective first cell. The busbar is located at the same side of the respective first cell and electrically connected to the two electrodes to allow the plurality of first cells to be connected in parallel and/or in series.

In the above energy storage power supply, the two electrodes are located at the same side of the respective first cell and are electrically connected to each other by the busbar. As such, the welding space is reduced, which can simplify the structure of the energy storage power supply with a high space utilization rate.

In some embodiments, the plurality of first cells includes a plurality of sheet-like first cells or a plurality of cylindrical first cells.

In some embodiments, one of the two electrodes is a positive electrode, and the other one of the two electrodes is a negative electrode.

In some embodiments, the energy storage power supply includes a support having a position-limiting groove and being arranged at a top of the first cell to allow the two electrodes to pass through the position-limiting groove. The busbar is arranged at the support.

In some embodiments, the first housing has an accommodation chamber defined inside the first housing. The accommodation chamber is provided with a first positioning portion. The first positioning portion has a positioning groove. The plurality of first cells is accommodated in the positioning groove.

In some embodiments, the energy storage power supply includes a fixing colloid located in the positioning groove and fixedly connected to the plurality of first cells and a side wall of the positioning groove.

In some embodiments, the first housing includes a first casing and a second casing. The first casing and the second casing are detachably connected to each other and form the accommodation chamber together. The first positioning portion is arranged at the first casing or the second casing.

An embodiment of the present disclosure provides an energy storage power supply. The energy storage power supply includes a second housing, at least one second cell, a fixing member, and an electrical connection member. The second housing is provided with a second positioning portion at an inner wall of the second housing. Each of the at least one second cell has a first end inserted into the second positioning portion and a second end opposite to the first end. Each of the at least one second cell is provided with two electrodes at the second end of a respective second cell of the at least one second cell. The fixing member is configured to fix the second end of each of the at least one second cell. The electrical connection member is electrically connected to the second end of each of the at least one second cell.

In the above energy storage power supply, the second positioning portion is arranged at the inner wall of the second housing, and the first end of the second cell may be directly inserted into the second positioning portion, instead of being fixed by the support to be assembled into the second housing. As such, spare parts are saved while simplifying mounting procedures, which in turn can lower cost and reduce a volume of the energy storage power supply. In addition, with the second end of the second cell being fixed by the fixing member and connected to the electrical connection member, the overall fixing and electrical connection of the second cell in the second housing.

Additional aspects and advantages of the embodiments of present disclosure will be provided at least in part in the following description, or will become apparent in part from the following description, or can be learned from the practice of the embodiments of the present disclosure.

Referring to FIGS. 1 and 2, an energy storage power supply 100 according to an embodiment of the present disclosure includes a first housing 10, a fixing colloid, and at least one first cell 20. The first housing 10 has an accommodation chamber 11 defined inside the first housing 10. The accommodation chamber 11 is provided with a positioning portion 12. The first positioning portion 12 has a positioning groove 121. The at least one first cell 20 is accommodated in the positioning groove 121. The fixing colloid is located in the positioning groove 121 and fixedly connected to the first cell 20 and a side wall of the positioning groove 121.

In the above energy storage power supply 11, the first positioning portion 12 is arranged at an inner wall of the accommodation chamber, the positioning groove 121 is arranged in the first positioning portion 12, the at least one first cell 20 is accommodated in the positioning groove 121, and the at least one first cell 20 is fixed by the first positioning portion 12 and the fixing colloid. In this way, the at least one first cell 20 can be directly mounted in the positioning groove 121, and there is no need for a battery module to be first assembled and then mounted into the first housing 10, which reduces an assembly process and lowers cost. Furthermore, the parts required to assemble the battery module can also be reduced, thereby improving a space utilization rate of the product and reducing a product size.

In one embodiment, at least part of the first housing 10 of the energy storage power supply 100 forms an accommodation chamber 11. A first positioning portion 12 is accommodated in the accommodation chamber 11. The first positioning portion 12 is arranged at a bottom of the energy storage power supply 100 and fixedly connected to a bottom wall of the accommodation chamber 11. The first positioning portion 12 forms a positioning groove 121 configured to accommodate the first cell 20. A number of first cells 20 is not limited herein and may be determined based on a battery capacity required for the energy storage power supply 100. After the first cells 20 are orderly arranged in the positioning groove 121, the fixing colloid may be injected into the positioning groove 121, and after the fixing colloid is cured, the connection between the first cells 20 and the first positioning portion 12 is completed. The fixing colloid can connect the first cells 20 and the first positioning portion 12 as a whole by using an arrangement gap between the first cells 20, and no other connection members need to be arranged. Therefore, the number of parts can be reduced with an optimization in a product structure and an assembly process as well as an improvement in volume energy density and mass energy density of the product, the cost is reduced, and the product is easy to carry. In another embodiment, the first positioning portion 12 may be arranged elsewhere in the energy storage power supply 100 and fixedly connected to a top wall or a side wall of the accommodation chamber 11. In yet another embodiment, some of the first cells 20 may be accommodated in the first positioning portion 12, or all of the first cells 20 may be accommodated in the first positioning portion 12.

Figure 3:
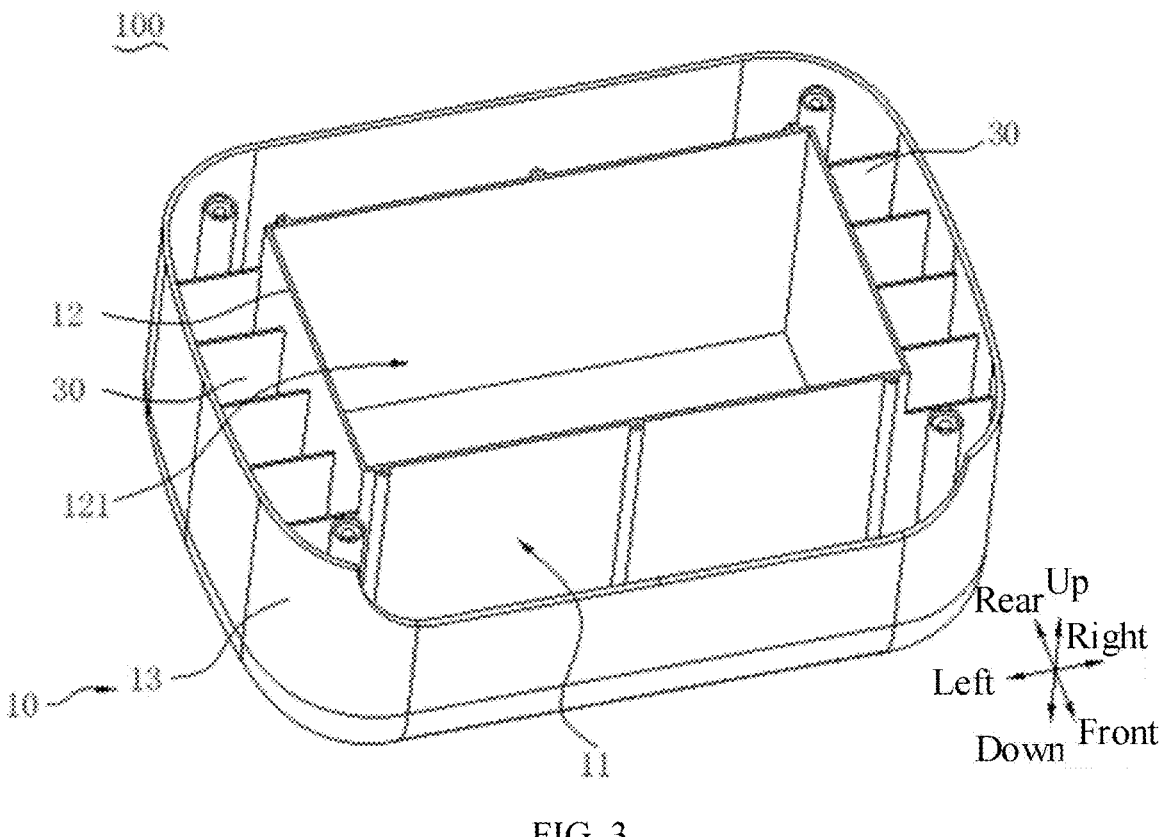
FIG. 3 is a schematic structural view of a first housing according to an embodiment of the present disclosure.

Referring to FIGS. 2 and 3, in some embodiments, the energy storage power supply 100 includes a reinforcement rib 30 connected to a side wall of the first positioning portion 12 and a side wall of the accommodation chamber 11.

In this way, structural strength of the first positioning portion 12 and structural strength of the first housing 10 can be improved.

Referring to FIGS. 2 and 3, in one embodiment, the reinforcement rib 30 may have a plate-like structure. Two sides of the plate-like reinforcement rib 30 are connected to the first positioning portion 12 and the first housing 10 respectively, and therefore the first positioning portion 12 and the first housing 10 are formed integrally to reduce shaking of the first positioning portion 12. It can be understood that in order to reduce a weight of the reinforcement rib 30, the reinforcement rib 30 may be in other shapes or has a hole at a surface of the reinforcement rib 30 or has a hollow structure. The reinforcement rib 30 may be made of the same material as the first positioning portion 12 and the first housing 10 and connected to the first positioning portion 12 and the first housing 10 through welding. The reinforcement rib 30, the first positioning portion 12, and the first housing 10 may be made of steel, copper, aluminum, or the like. The reinforcement rib 30 may be arranged at two opposite sides of the first positioning portion 12, or may be arranged around the first positioning portion 12 to strengthen a fixing effect. In addition, the reinforcement rib 30 includes a vertical reinforcement rib 30 or a transverse reinforcement rib 30, thereby reducing deformation of the first housing 10 or deformation of the first positioning portion 12 due to impact or a temperature change.

In some embodiments, the fixing colloid includes a structural adhesive.

In this way, the safety of the first cells 20 can be improved.

In one embodiment, the structural adhesive can withstand relatively large loads. By injecting the structural adhesive into the positioning groove 121, impact resistance of the first cells 20 can be enhanced. When the first housing 10 of the energy storage power supply 100 suffers damage that directly impacts the first cells 20, the structural adhesive can withstand a part of an impact force and meanwhile can transmit the impact force to the overall first cells 20 to reduce the impact damage. In addition, the structural adhesive has good corrosion resistance. When an electrolyte leaks out of the first cells 20 due to structural damage of some of the first cells 20 or the electrolyte is ejected from an explosion-proof valve (not shown) of the first cells 20 due to thermal runaway, the structural adhesive can prevent further leakage of the electrolyte and corrosion of other of the first cells 20 or other structural components. At the same time, the structural adhesive can also have good thermal conductivity, and therefore heat generated by the first cells 20 is transferred to the first positioning portion 12 and the first housing 10, which helps to lower an operation temperature of the first cells 20.

Figure 4:
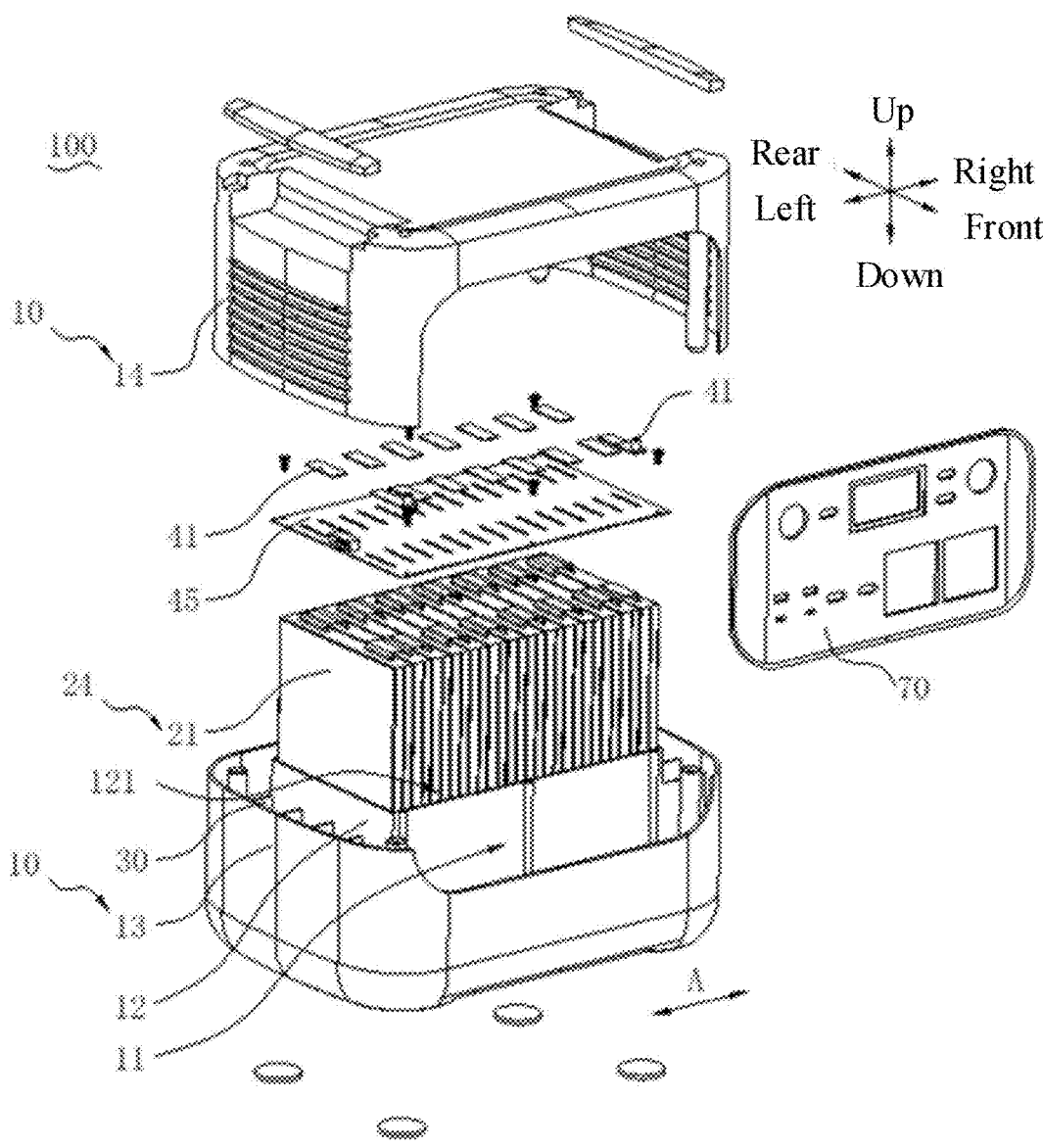
FIG. 4 is an exploded schematic view of an energy storage power supply according to an embodiment of the present disclosure.
Figure 5:
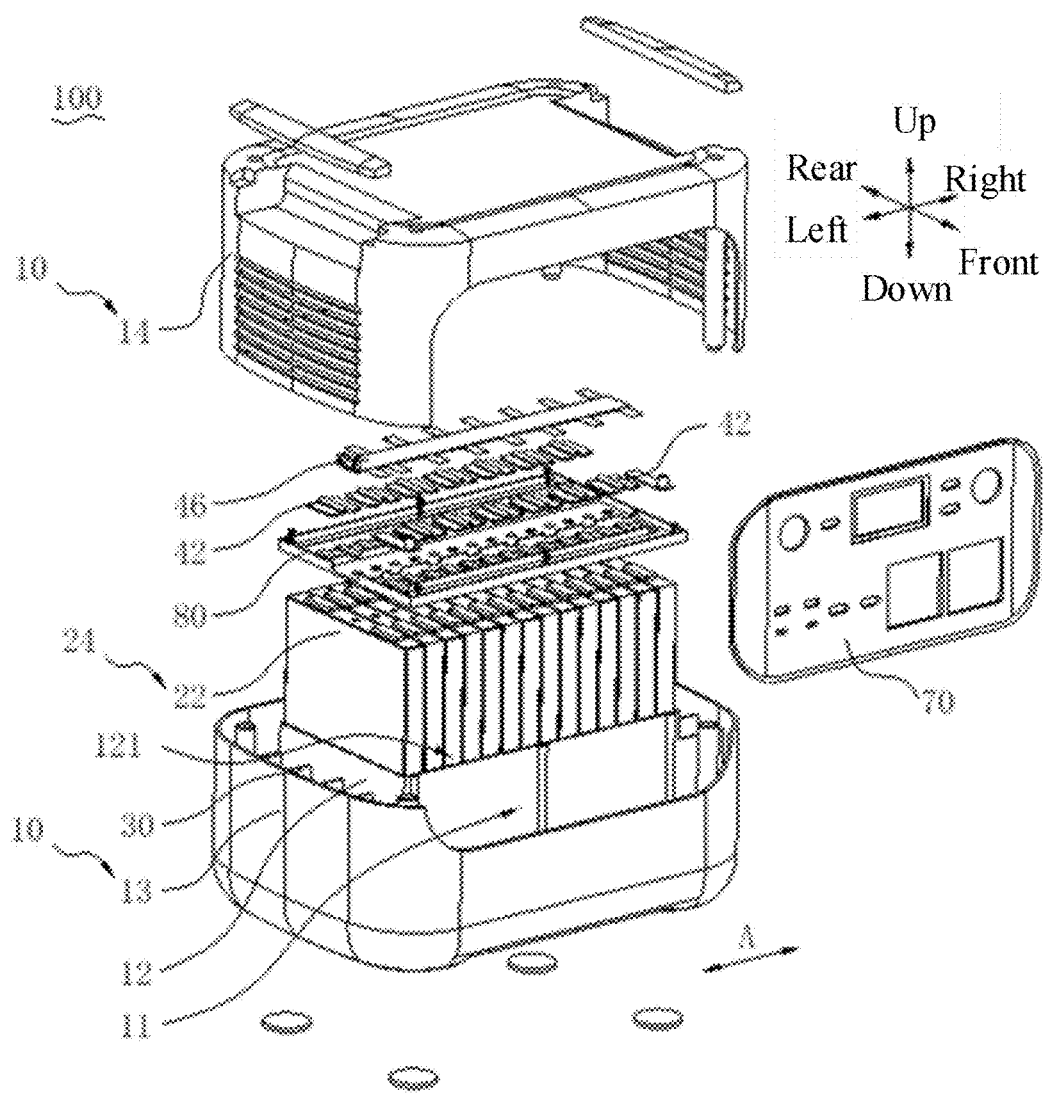
FIG. 5 is another exploded schematic view of an energy storage power supply according to an embodiment of the present disclosure.

Referring to FIGS. 4 and 5, in some embodiments, the at least one cell 20 includes a plurality of sheet-like cells 24 stacked to each other.

In this way, energy density of the at least one first cell 20 can be increased.

Referring to FIG. 4, in one embodiment, the sheet-like cell 24 may be a soft-pack cell 21 using an aluminum-plastic film or a steel-plastic film, which thus can reduce a thickness of a shell and increase the energy density of a single cell 20. Also, when a safety hazard occurs, the shell of the soft-pack cell 21 can also release an internal stress in a form of bulging or cracking, thereby improving the safety of the soft-pack cell 21. The soft-pack cells 21 each may have a width matched with a width of the first positioning portion 12 and are stacked to each other in a length direction A. In other embodiments, the soft-pack cells 21 each may have a width approximately half of a width of the first positioning portion 12, and therefore two rows of soft-pack cells 21 may be placed side by side inside the positioning groove 121 while reserving a gap for accommodating the fixing colloid.

In addition, as illustrated in FIG. 5, in another embodiment, the sheet-like cell 24 may be a prismatic cell 22 has a shell made of aluminum alloy, stainless steel, or the like. The prismatic cell 22 has high structural strength and good mechanical load-bearing capacity. The prismatic cells 22 each may also have a width matched with a width of the first positioning portion 12 and are stacked in a length direction A.

Referring to FIGS. 4 and 5, in some embodiments, the first cell 20 includes two electrodes at a same side of the first cell 20.

In this way, the structure of the energy storage power supply 100 can be simplified.

Referring to FIGS. 4 and 5, in some embodiments, the electrodes of the first cell 20 are ports for outputting or inputting electric energy. Each first cell 20 includes a positive electrode and a negative electrode that are simultaneously arranged at a top, a bottom, or other side surfaces of the first cell 20. When the energy storage power supply 100 includes two or more cells 20, the electrodes of each cell 20 are arranged on a top side surface, a bottom side surface, or other side surfaces of the first cell 20, and therefore the electrodes of all the first cells 20 can be connected only at one side surface of the first positioning portion 12. A required connection space is smaller through the more centralized connection mode, thereby helping to simplify the structure of the energy storage power supply 100. As illustrated in FIG. 4, In one embodiment, the first cell 20 may be a soft-pack cell 21. Two electrodes of each soft-pack cell 21 are arranged upward. The energy storage power supply 100 includes a first busbar 41. The first busbar 41 is connected to electrodes of a same polarity of two adjacent soft-pack cells 21 at a top of the soft-pack cell 21 to allow the two soft-pack cells 21 to be connected in parallel to output electric energy. A plurality of first busbars 41 may be connected in series or connected in parallel to output the electric energy outward or input the electric energy inward. The first busbar 41 may be made of copper, aluminum, nickel, or an alloy material. After the first busbar 41 is fixed to a correct position by a tooling fixture, the first busbar 41 and the electrodes of the soft-pack cell 21 may be welded together through laser welding. It should be understood that the electrical connection between the first busbar 41 and the electrodes of the soft-pack cell 21 may also be realized by other connection methods such as twisting or pressing.

In addition, the energy storage power supply 100 may collect state information of each soft-pack cell 21 through a first collection plate 45, which includes information such as a voltage, a current, and a temperature of each soft-pack cell 21. After the first busbar 41 is welded, the first collection plate 45 can be fixed to a corresponding position on the first busbar 41 by a screw. After the first collection plate 45 is fixed, a nickel strip of the first collection plate 45 may be electrically connected to the first busbar 41 through laser welding, or the like, thereby realizing the electrical connection between the first collection plate 45 and the first busbar 41.

As illustrated in FIG. 5, in another embodiment, the first cell 20 may also be a prismatic cell 22. Two electrodes of the prismatic cell 22 are also arranged upward. The energy storage power supply 100 includes a support 80. The support 80 includes a position-limiting groove and arranged at a top of the prismatic cell 22 to allow the two electrodes of the prismatic cell 22 to pass through the position-limiting groove. The support 80 may be made of a plastic, thereby avoiding a short circuit caused by an electrical connection of the two electrodes of one prismatic cell 22 through the support 80. The energy storage power supply 100 further includes a second busbar 42 and a second collection plate 46. After the electrodes of the prismatic cells 22 are positioned by the support 80, one second busbar 42 may be connected to the electrodes of two adjacent prismatic cells 22 and connected to the second busbars 42 by the second collection plate 46. The second busbar 42 and the first busbar 41, as well as the second collection plate 46 and the first collection plate 45, have similar characteristics and functions, and details thereof are not described herein.

Referring to FIGS. 6 to 9, in some embodiments, the at least one cell 20 includes a plurality of cylindrical cells 23. The positioning groove 121 has a first through hole 132 defined at a bottom wall of the positioning groove 121. An electrode at a bottom of the cylindrical cell 23 passes through the first through hole 132. The energy storage power supply 100 includes a plurality of busbars 40 configured to connect the plurality of cylindrical cells 23 in series and/or in parallel.

In this way, the safety of the first cells 20 can be improved.

Referring to FIGS. 6 to 9, in one embodiment, the two electrodes of the cylindrical cell 23 are arranged at two ends of the cylindrical cell 23, and the two electrodes may be distinguished as a first pole 231 and a second pole 232 respectively. The first pole 231 and the second pole 232 are current interfaces configured to power or charge the cylindrical cell 23. The first pole 231 may be a positive electrode and arranged at the bottom of the cylindrical cell 23, and the second pole 232 may be a negative electrode and arranged at the top of the cylindrical cell 23. In one embodiment, the polarities and the positions of the first pole 231 and the second pole 232 may also be interchanged. The plurality of busbars 40 may be classified into a third busbar 43 and a fourth busbar 44. The first pole 231 may pass through the first through hole 132 and be electrically connected to the first pole 231 of a cylindrical cell 23 adjacent to the first pole 231 through the third busbar 43. The second pole 232 may be electrically connected directly to the second pole 232 of the cylindrical cell 23 adjacent to the second pole 232 through the fourth busbar 44. The third busbar 43 may be electrically connected to four or more first poles 231. Likewise, the fourth busbar 44 may be electrically connected to four or more second poles 232. In another embodiment, the energy storage power supply 100 includes a third collection plate 47 and a fourth collection plate 48. The third collection plate 47 is connected to the third busbar 43, and the fourth collection plate 48 is connected to the fourth busbar 44, therefore state information of each cylindrical cell 23 can be collected through the third collection plate 47 and the fourth collection plate 48. The third busbar 43, the fourth busbar 44, and the first busbar 41 have similar characteristics and functions, and the third collection plate 47, the fourth collection plate 48, and the first collection plate 45 have similar characteristics and functions, which are not repeated herein.

Figure 6:
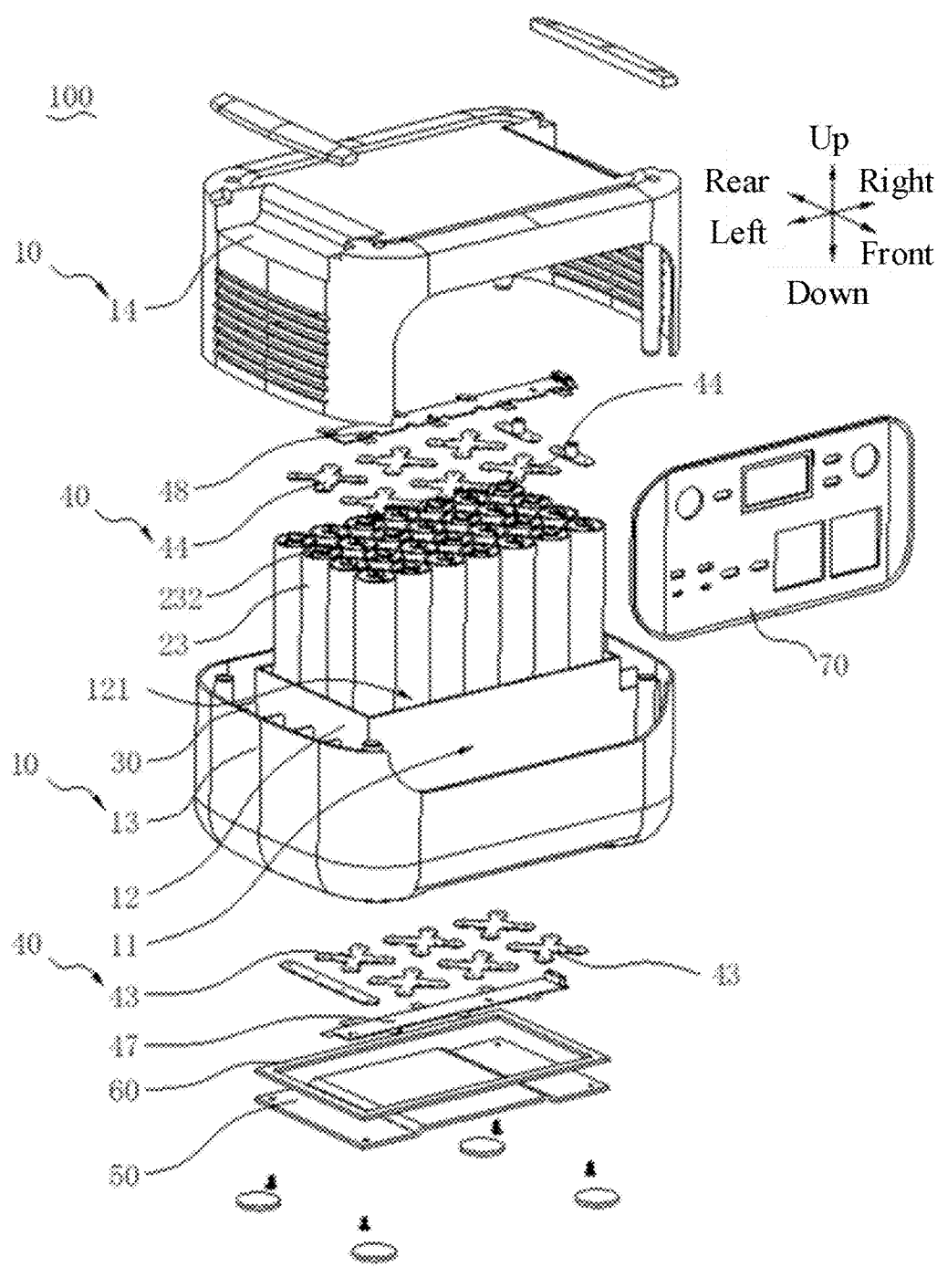
FIG. 6 is yet another exploded schematic view of an energy storage power supply according to an embodiment of the present disclosure.
Figures 7, 8:
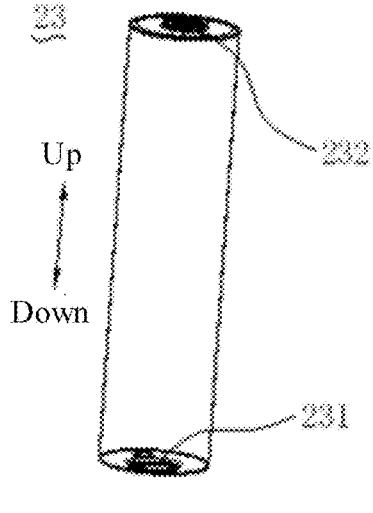
FIG. 7 is a schematic structural view of a cylindrical cell according to an embodiment of the present disclosure.
FIGS. 8 to 10 are some schematic structural views of a first casing according to an embodiment of the present disclosure.

Referring to FIGS. 6 and 8, in some embodiments, the energy storage power supply 100 further includes a cover plate 50. The housing has a receiving groove 131 defined at an outer wall surface of the first housing 10 and corresponding to the first positioning portion 12. The first through hole 132 passes through a bottom wall of the receiving groove 131. Some busbars 40 are located in the receiving groove 131. The cover plate 50 is arranged at the outer wall surface of the first housing 10 and covers the receiving groove 131.

In this way, a product volume is easily reduced.

Referring to FIGS. 6 and 8, in one embodiment, the cylindrical cell 23 is vertically accommodated in the positioning groove 121. An outer wall surface at a bottom of the first housing 10 is recessed inward to form a receiving groove 131. The first pole 231 of the cylindrical cell 23 passes through the first through hole 132 into the receiving groove 131. The plurality of busbars 40 includes a third busbar 43. The third busbar 43 may be connected to the first pole 231 in the receiving groove 131. In this way, the first pole 231 and the third busbar 43 may be integrated at the bottom of the first housing 10, thereby improving overall integration to reduce the product volume. By arranging the cover plate 50 to cover the receiving groove 131, integrity of the first housing 10 can be further improved and the first pole 231 and the third busbar 43 are protected. The cover plate 50 is fixed to the first housing 10 by a bolt, but may be fixed by other means, which is not limited herein. In another embodiment, the energy storage power supply 100 includes a third collection plate 47, which may be connected to the third busbar 43 in the receiving groove 131.

Referring to FIG. 6, in some embodiments, the energy storage power supply 100 further includes a thermal conductive adhesive connected to the cover plate 50 and the busbar 40.

In this way, a temperature of busbar 40 can be reduced.

Referring to FIG. 6, in one embodiment, the plurality of busbars 40 includes a third busbar 43. When a current flows through the third busbar 43, a certain current loss occurs and heat is generated. The accumulated heat causes a temperature of the third busbar 43 and the temperature of the cylindrical cell 23 to rise, leading to fire and other safety hazards. Therefore, by filling the heat conductive adhesive between the third busbar 43 and the cover plate 50, the heat of the third busbar 43 can be transferred to the cover plate 50. Thus, the heat can be dissipated to a surrounding environment through the cover plate 50 to achieve an effect of cooling the third busbar 43 and the cylindrical cell 23. The cover plate 50 may be made of aluminum, thereby providing a better heat transfer effect. At the same time, the first housing 10 can also be made of aluminum and other materials with a good heat transfer effect, to further transfer the heat of the cover plate 50 to the first housing 10, and thus to improve the effect of cooling the third busbar 43 and the cylindrical cell 23.

Referring to FIG. 6, in some embodiments, the energy storage power supply 100 further includes a sealing ring 60 connected to the cover plate 50 and the outer wall surface of the first housing 10 in a sealed manner.

In this way, a sealing effect of the receiving groove 131 can be improved.

Referring to FIG. 6, in one embodiment, the housing has a receiving groove 131 formed at an outer wall surface of the first housing 10. A busbar 40 is accommodated in the receiving groove 131. In a humid operating environment, poor sealing of the receiving groove 131 may lead to moisture infiltration into the receiving groove 131, and the infiltrated moisture can cause corrosion or even a short circuit in the busbar 40. Therefore, when the cover plate 50 covers the receiving groove 131, the sealing ring 60 may be arranged between the cover plate 50 and the outer wall of the first housing 10 to enhance the sealing effect on the receiving groove 131, and further to isolate the busbar 40 in the receiving groove 131 from the moisture in the ambient environment.

Referring to FIGS. 1, 2, 8, 9, and 10, in some embodiments, the first housing 10 includes a first casing 13 and a second casing 14. The first casing 13 and the second casing 14 are detachably connected to each other and form the accommodation chamber 11 together. The first positioning portion 12 is arranged at the first casing 13 or the second casing 14.

In this way, mounting or repair is facilitated.

Figure 9:
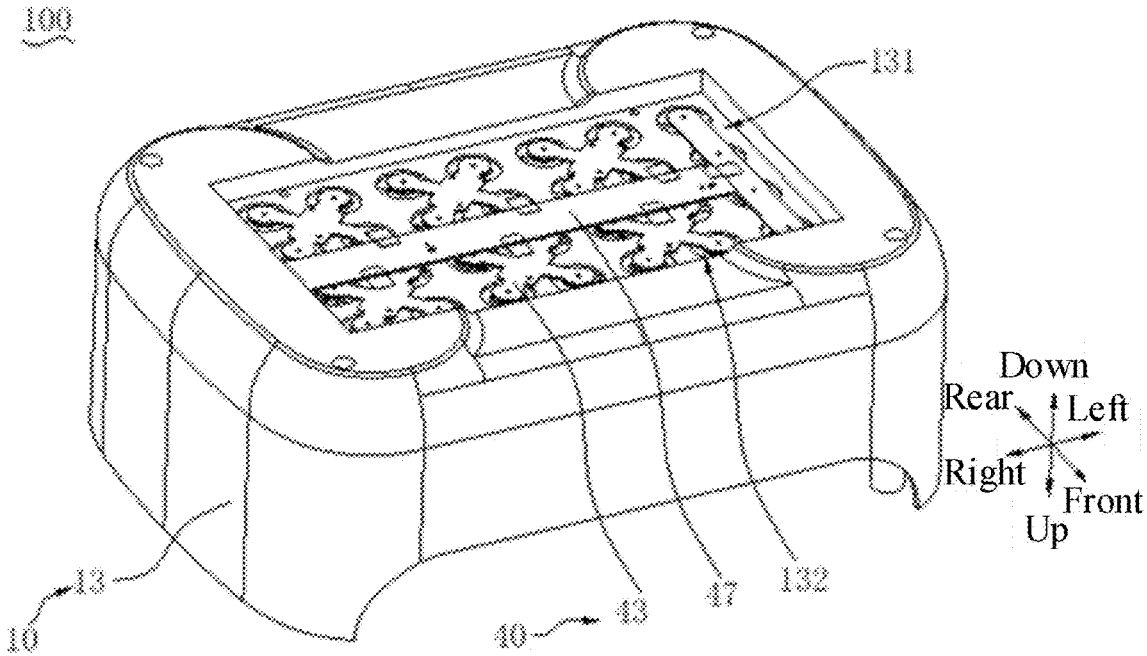
Figure 10:
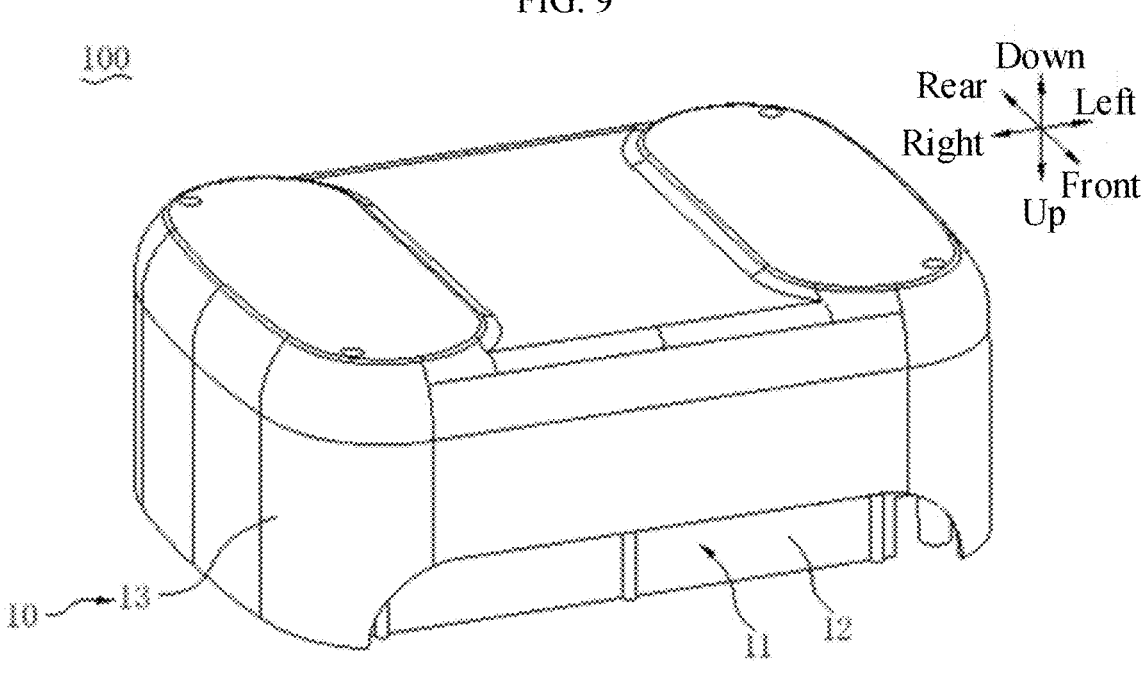

In one embodiment, FIGS. 2, 8, and 9 are schematic structural views of a first casing 13 In one embodiment where the first cell 20 is a cylindrical cell 23. FIG. 10 is a schematic structural view showing a first casing 13 In one embodiment where the first cell 20 is a soft-pack cell 21 or a prismatic cell 22. Referring to FIGS. 1, 2, 8, 9, and 10, In one embodiment, the first housing 10 includes a first casing 13 located at an upper portion and a second casing 14 located at a lower portion. In some embodiments, the first casing 13 and the second casing 14 may also be located at a front part and a rear part or a left part and a right part of the first housing 10, or the first casing 13 and the second casing 14 may be arranged at two opposite corners of the first housing 10. The first casing 13 and the second casing 14 may be detachably connected to each other through thread, snap-fitting, or clamp. The first casing 13 and the second casing 14 form the accommodation chamber 11 to accommodate the first cell 20. Thus, convenience of assembly or disassembly for maintenance can be increased.

In addition, referring to the FIG. 1, in some embodiments, the energy storage power supply 100 may further include a panel 70 arranged at the first housing 10. The panel 70 can display current information of the energy storage power supply 100 such as a charge level and a battery temperature. The panel 70 further includes a port of the energy storage power supply 100 configured to connect an electrical device or a charging device, such that the first cell 20 may power the electrical device or be charged by the charging device.

In the related art, two battery supports are generally used to fix the two ends of the cell, the corresponding electrical connectors, and the corresponding collection plates respectively to form a battery pack which is then mounted into the cell. This results in numerous spare parts, large size, high cost, and complicated mounting procedures for the energy storage power supply. On the other hand, since the cell needs to reserve space for mounting the battery pack, the volume of the energy storage power supply is further increased.

Figure 11:
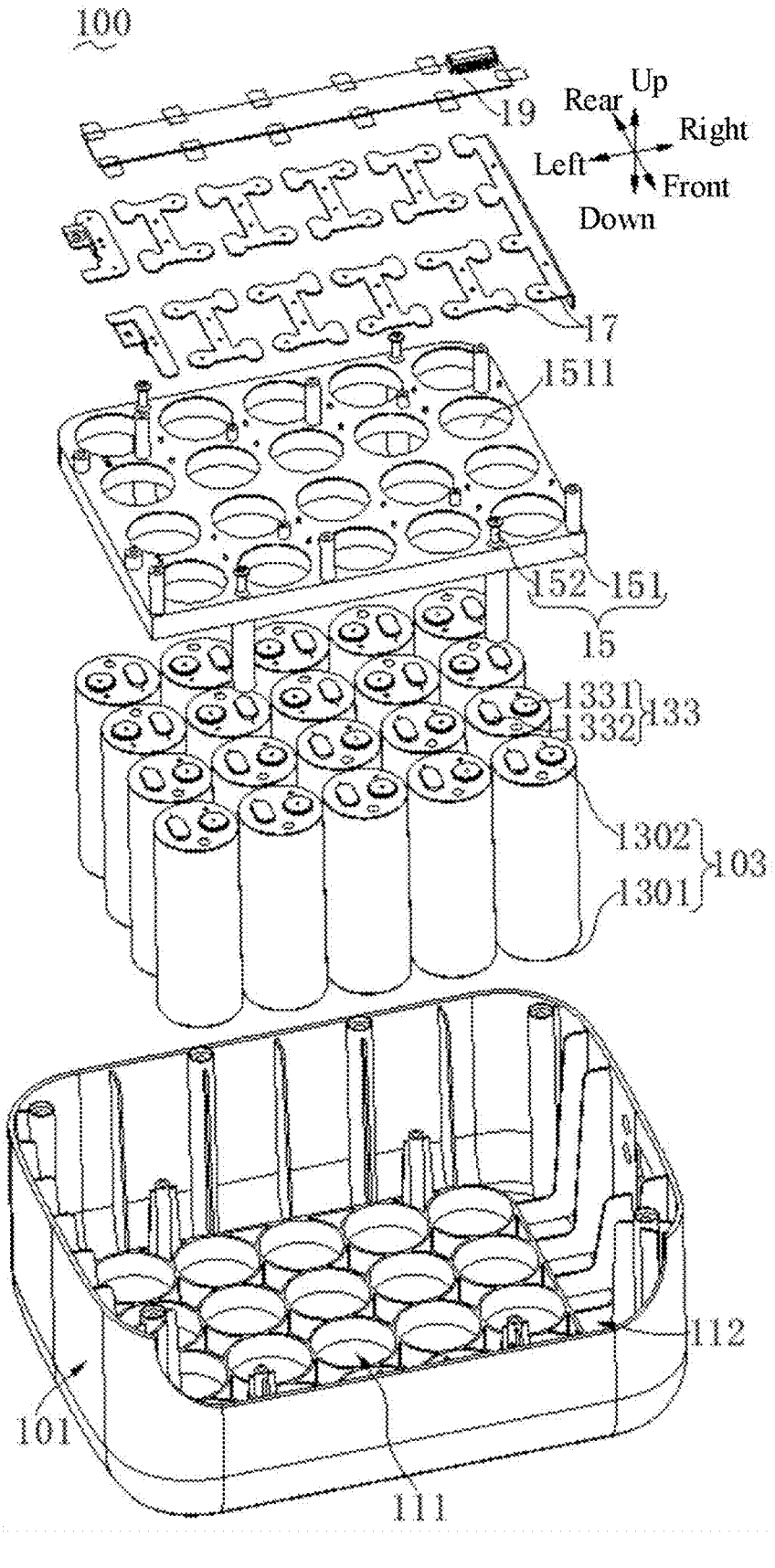
FIG. 11 is a perspective exploded view illustrating an energy storage power supply according to an embodiment of the present disclosure.
Figure 12:
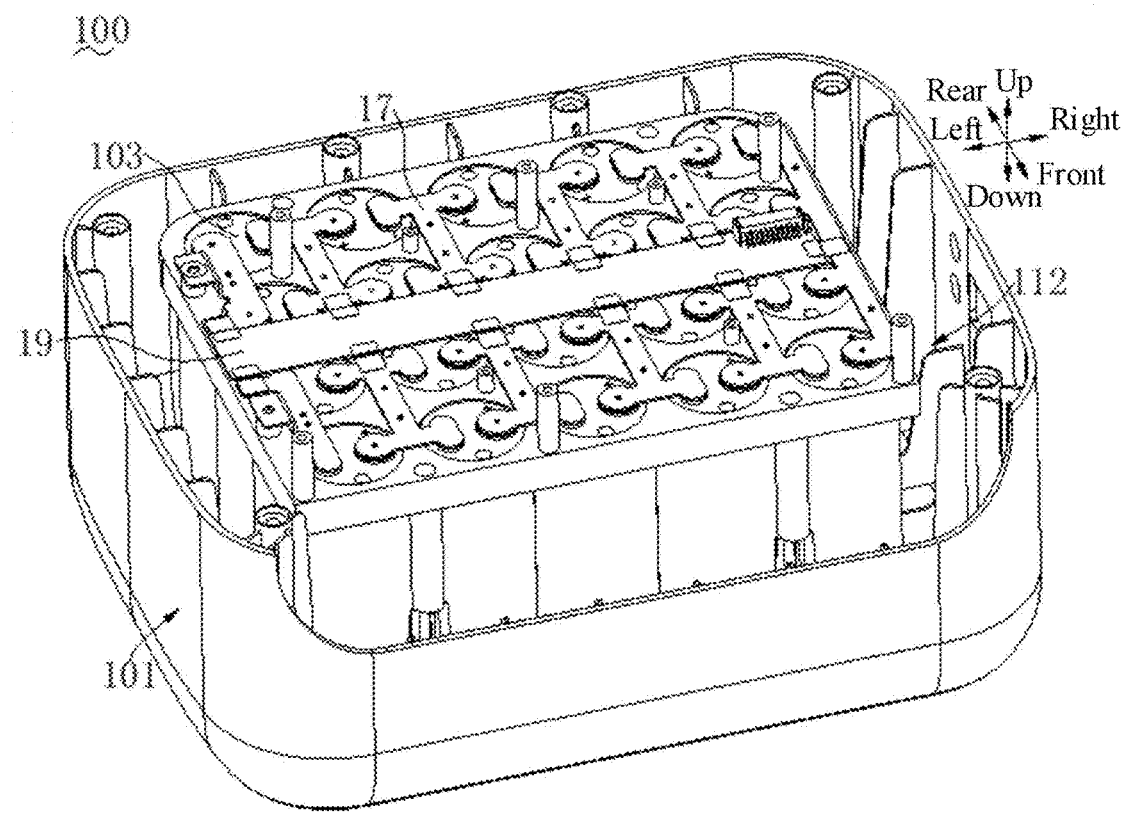
FIGS. 12 to 13 are perspective exploded schematic views of an energy storage power supply according to an embodiment of the present disclosure.
Figure 13:
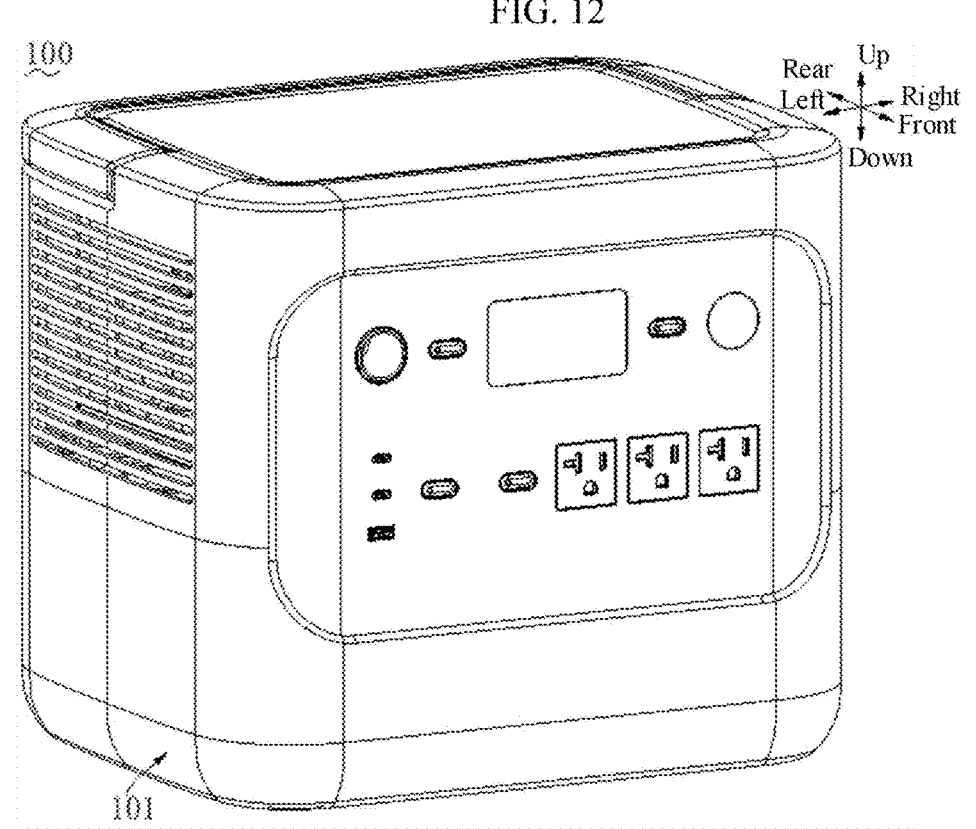

Referring to FIGS. 11 to 13, an embodiment of the present disclosure provides an energy storage power supply 100. The energy storage power supply 100 includes a second housing 101, at least one second cell 103, a fixing member 15, and an electrical connection member 17. The second housing 101 is provided with a second positioning portion 111 at an inner wall of the second housing 101. Each of the at least one second cell 103 has a first end 131 inserted into the second positioning portion 111 and a second end 132 opposite to the first end 131. Each of the at least one second cell 103 is provided with two electrodes 133 at the second end 133 of a respective second cell 132 of the at least one second cell 103. The fixing member is configured to fix the second end 132 of each of the at least one second cell 103. The electrical connection member 17 is electrically connected to the second end 132 of each of the at least one second cell 103.

In the above energy storage power supply 100, the second positioning portion 111 is arranged at the inner wall of the second housing 101, and the first end 131 of the second cell 103 may be directly inserted into the second positioning portion 111, instead of being fixed by the support to be assembled into the second housing 101. As such, the spare parts are saved while simplifying the mounting procedures. The second housing 101 does not require the mounting space, which can lower the cost of the energy storage power supply 100 and reduce the volume of the energy storage power supply 100. In addition, with the second end 132 of the second cell 103 being fixed by the fixing member 15 and connected to the electrical connection member 17, the overall fixing and the electrical connection of the second cell 103 in the second housing 101.

In one embodiment, as illustrated in FIGS. 11 and 12, at least a part of the second housing 101 of the energy storage power supply 100 forms a containing chamber 112 internally provided with a second positioning portion 111, and the second positioning portion 111 can be configured to guide the fixing of the end of each of the at least one second cell 103. As such, as compared to fixing the two ends of the second cell 103 using the two supports respectively, the number of supports can be reduced, simplifying the assembly steps and reducing the production cost.

In one embodiment, as illustrated in FIG. 11, the second cell 103 includes a first end 131 and a second end 132 opposite to the first end 131. As a result, in the energy storage power supply 100, the stability of the second cell 103 inside the energy storage power supply 100 is ensured by separately fixing the first end 131 and the second end 132 of the second cell 103.

It is understood that the first end 131 and the second end 132 of the second cell 103 may be a lower end and an upper end, a left end and a right end, a front end and a rear end, or other ends opposite to each other, respectively, of the corresponding second cell 103. In relation to factors such as a shape or a placement direction of the second cell 103, the second positioning portion 111 and the fixing member 15 may be fixed by the first end 131 and the second end 132 respectively, to allow the second cell 103 to be safely placed inside the energy storage power supply 100, to ensure normal operation of the energy storage power supply 100, without specific limitation herein.

In one embodiment, the second positioning portion 111 is arranged at the inner wall of the second housing 101, which is equivalent to merging one of the supports into the second housing 101, i.e., the second positioning portion 111 and the second housing 101 are integrally formed and cannot be detached, to allow one end of the second cell 103 to be directly mounted at the second housing 101, and thus to realize the "Cell to pack" (CTP) structure, i.e., a module-free technology that can omit the battery modules or reduce the number of battery modules to be assembled (the battery module includes a support, a bolt, and other spare parts), without the need to reserve the mounting space. In this way, the cost can be lowered and product miniaturization can be achieved.

In one embodiment, the second positioning portion 111 may be arranged at different positions of the inner wall of the second housing 101, such as an inner side wall, an inner bottom wall, or other positions of the second housing 101, to allow the first end 131 of each of the at least one second cell 103 to be fixed to the second positioning portion 111, and thus to ensure that one of the ends of the at least one second cell 103 is stably arranged in the energy storage power supply 100, without specific limitation herein.

For example, the second positioning portion 111 may be a positioning groove that matches the shape and the size of the first end 131. As illustrated in FIG. 11, for example, the second positioning portion 111 is a groove hole of a cylindrical shape, which may enable the first ends 131 of the at least one second cell 103 to form an interference fit with a corresponding number of positioning grooves respectively, to improve stability of the connection between the second cell 103 and the second positioning portion 111.

In one embodiment, as illustrated in FIG. 11, the energy storage power supply 100 includes a fixing member 15 detachably connected inside the energy storage power supply 100. The fixing member 15 is arranged opposite to the second positioning portion 111 and can be configured to fix the second end 132 to ensure that the second end 132 is stably arranged inside the energy storage power supply 100. Thus, the overall stability of the at least one second cell 103 is improved. Therefore, safe operation of the energy storage power supply 100 is ensured.

In one embodiment, as illustrated in FIG. 11, the electrical connection members 17 are the busbars and configured to connect, when a plurality of second cell 103 is provided, the plurality of second cells 103 in series and/or in parallel.

In one embodiment, as illustrated in FIG. 11, the plurality of electrical connection members 17 is provided with a plurality of positioning holes (not shown) respectively, and the fixing member 15 is provided with a plurality of positioning posts (not shown) corresponding to the plurality of positioning holes to enable the positioning holes and the positioning posts to be connected in correspondence. For example, the positioning holes and the positioning posts may form an interference fit, or may be engaged with each other through a screw, or may be connected in other ways, thereby ensuring that the electrical connection member 17 is fixedly mounted at the fixing member 15 with good connection stability.

In one embodiment, the fixing member 15 is formed with a plurality of second through holes 1511 to ensure that the second end 132 of each of the at least one second cell 103 is exposed through the plurality of second through holes 1511, to allow for the electrical connection between the electrical connection member 17 and the at least one second cell 103, thereby ensuring that the energy storage power supply 100 discharges outwardly to output the electrical energy or charges inwardly to input the electrical energy.

It will be appreciated that, as illustrated in FIGS. 11 and 12, the electrical connection member 17 may be electrically connected to the at least one second cell 103 through welding to allow the electrical connection member 17 to be connected in series and/or in parallel to the at least one second cell 103, and thus to allow the energy storage power supply 100 to provide a suitable power supply voltage to satisfy a user's usage requirements.

In one example, the electrical connection member 17 can be configured to connect each positive pole of the at least one second cell 103 to form a total positive connection port, and each negative pole to form a total negative connection port, i.e., the electrical connection member 17 is connected in parallel to the at least one second cell 103 to allow the at least one second cell 103 to be formed as a stable output power supply, and thus to ensure the normal operation and good durability of the energy storage power supply 100.

In another example, the electrical connection member 17 can configured to connect each positive pole and each negative pole of the at least one second cell 103 sequentially and alternately to allow the positive pole and the negative pole that are connected to the two ends of the electrical connection member 17 to be a positive connection port and a negative connection ports, respectively, i.e., the electrical connection member 17 is connected in series to the at least one second cell 103 to allow the at least one second cell 103 to be formed as a large-voltage output power supply, and thus to ensure that the user's usage requirements are satisfied.

In one embodiment, as illustrated in FIGS. 11 and 12, the energy storage power supply 100 further includes a collection plate 19 provided with nickel strips in an array in a left-right direction, and the nickel strips may be fixedly connected to the electrical connection member 17 through welding such as laser welding to ensure that the energy storage power supply 100 timely collects and obtains the state information of each of the at least one second cell 103, and the state information of the at least one second cell 103 includes information such as a temperature, a current, and a voltage, and thus to ensure the safe operation of the energy storage power supply 100.

That is, after the electrical connection member 17 has been welded to the respective second cell 103, the collection plate 19 can be fixed to the corresponding position of the electrical connection member 17 by the screw. After the collection plate 19 is fixed, the nickel strips of the collection plate 19 and the electrical connection member 17 may be connected through the electrical connection such as the laser welding, thereby realizing the electrical connection between the collection plate 19 and the electrical connection member 17.

It is worth noting that the first end 131 may be a pole-free end, and the second end 132 may be a pole-end with at least two poles of different electrical polarities, enabling the energy storage power supply 100 to provide the electrical connection member 17 and the collection plate 19 only at the second end 132 of the second cell 103, and enabling the electrical connection member 17 and the collection plate 19 to be electrically connected to the positive pole and the negative pole arranged at the second end 132 of the second cell 103, respectively, thereby ensuring normal charging and discharging of the second cell 103. Therefore, the number and the arrangement space of the electrical connection members 17 and the collection plates 19 are reduced which facilitates the miniaturized design of the energy storage power supply 100.

Referring to FIGS. 14 to 21, in some embodiments, the second positioning portion 111 is located at an inner bottom wall 113 or the inner side wall 115 of the second housing 101.

In this way, the second cell 103 is ensured to be stably placed through the inner bottom wall 113 or the inner side wall 115 of the second housing 101 to meet different product mounting requirements.

In one embodiment, as illustrated in FIGS. 14 to 17, the second positioning portion 111 is located at the inner bottom wall 113 of the second housing 101. That is, the second positioning portion 111 is in no contact with a side edge of the second housing 101, which can form inward space for placing the second cell 103 perpendicularly to a plane of paper, such that the inner bottom wall 113 of the second housing 101 and a baffle (not shown) forming the second positioning portion 111 form a stable support structure together, thereby ensuring that the first end 131 of the second cell 103 is stably placed in the second positioning portion 111.

It is to be understood that the inner bottom wall 113 of the second housing 101 may serve as a support base that can carry the second cell 103 placed in the second positioning portion 111 to improve the stable placement of the second cell 103, thereby ensuring the safe operation of the second cell 103.

Figure 15:
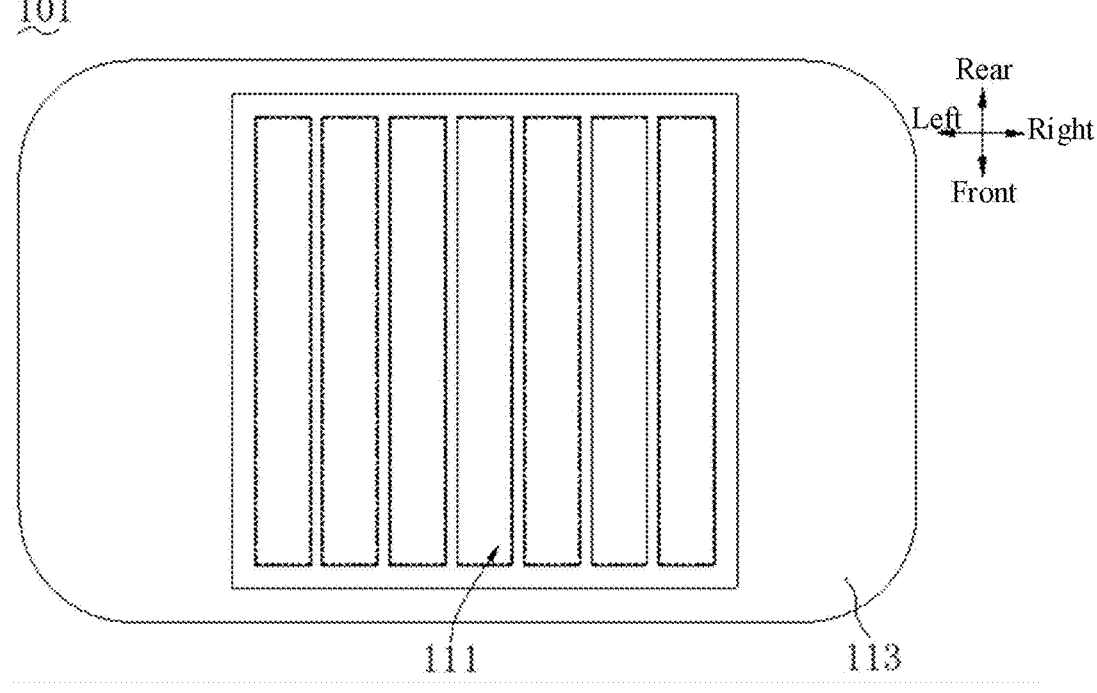

In one example, as illustrated in FIG. 15, the second cell 103 may be sheet like or of a square shape and can be configured for mounting of the second positioning portion 111 placed in a rectangular groove hole to ensure the stability of the second cell 103.

Figure 14:
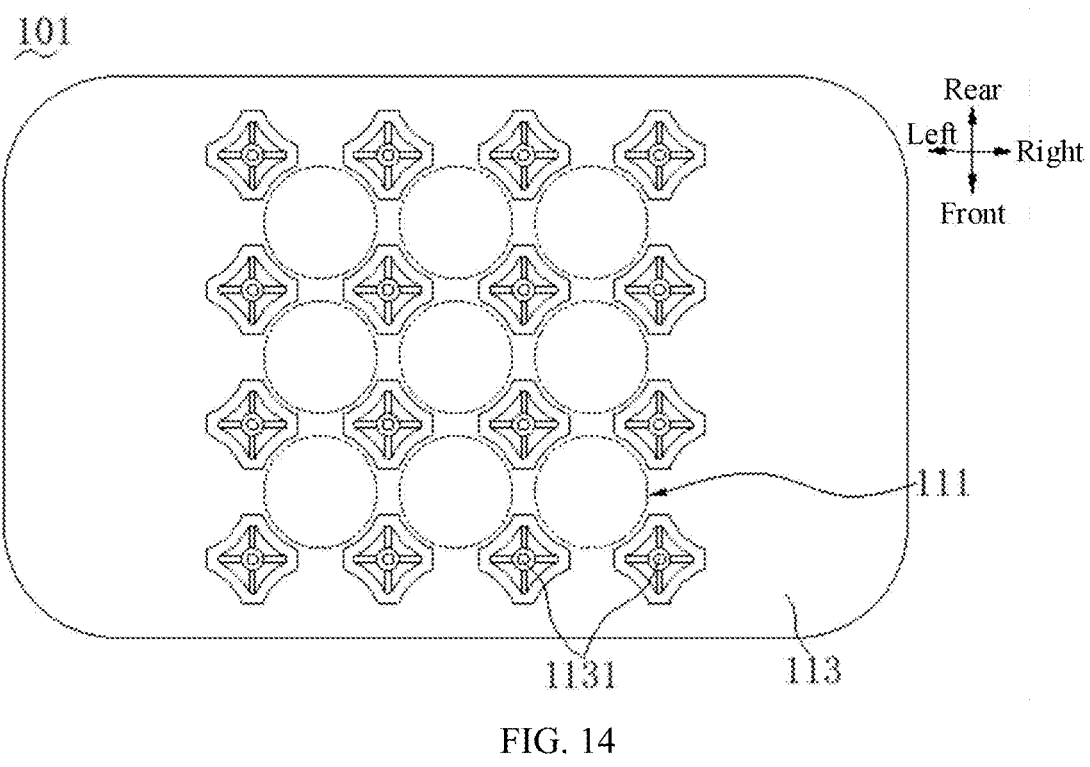
FIGS. 14 to 17 are top views of an inner bottom wall of a housing according to an embodiment of the present disclosure provided with a positioning portion.
Figure 16:
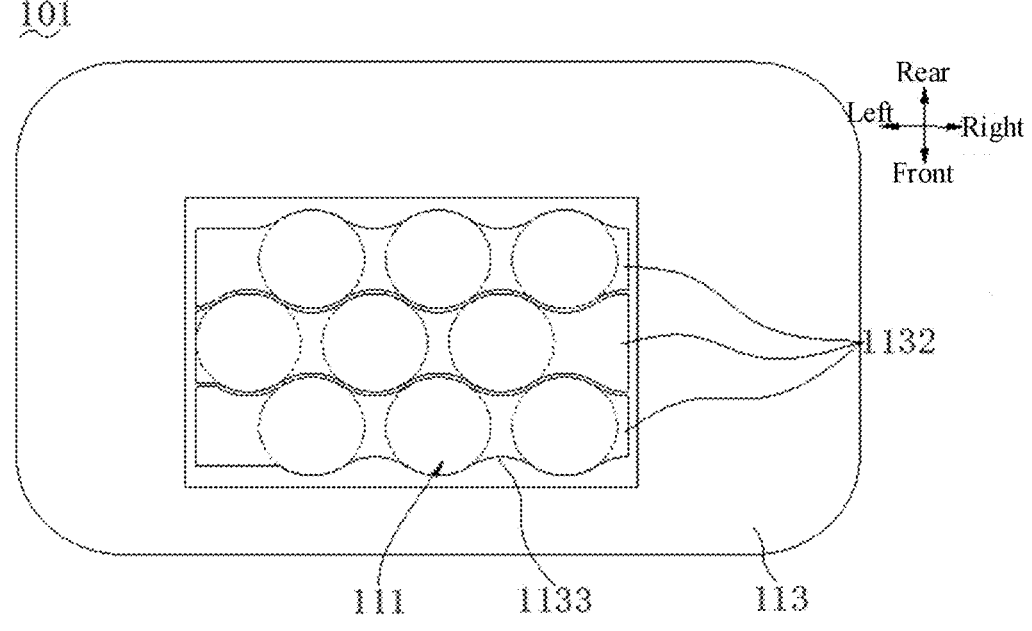
Figure 17:
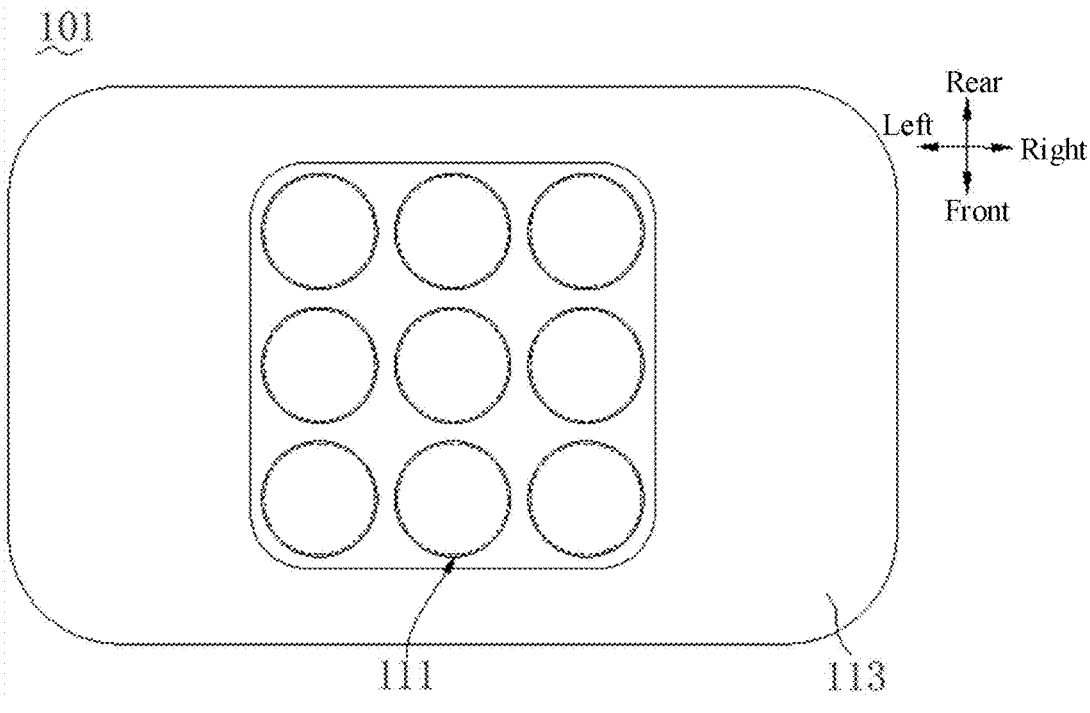

In another example, as illustrated in FIGS. 14, 16, and 17, the second cell 103 may also be of a cylindrical shape and can be configured for mounting of the second positioning portion 111 placed in a cylindrical groove hole to ensure the stability of the second cell 103.

In other examples, the second cell 103 may also be of other shapes to match the second positioning portion 111 of the corresponding shape to ensure the stable placement of the second cell 103, without specific limitation herein.

In one embodiment, as illustrated in FIGS. 18 to 21, the second positioning portion 111 is located at an inner side wall 115 of the second housing 101. That is, the second positioning portion 111 is in direct contact with a side edge of the second housing 101, which can form inward space for placing the second cell 103 perpendicularly to a plane of paper, such that the inner side wall 115 of the second housing 101, the inner bottom wall 113, and a baffle (not shown) forming the second positioning portion 111 The inner side wall 115, the inner bottom wall 113 and the baffle plate form a stable support structure together, thereby ensuring that the first end 131 of the second cell 103 is stably placed in the second positioning portion 111.

It can be understood that the inner side wall 115 of the second housing 101 can serve as a part of the baffle that can limit a position of the second cell 103 and fix the second cell 103 to allow the second cell 103 to be stably placed in the second positioning portion 111. At the same time, the inner bottom wall 113 of the second housing 101 can serve as a support base that can carry the second cell 103 placed in the second positioning portion 111 to improve the stable placement of the second cell 103, thereby ensuring the safe operation of the second cell 103.

Figure 18:
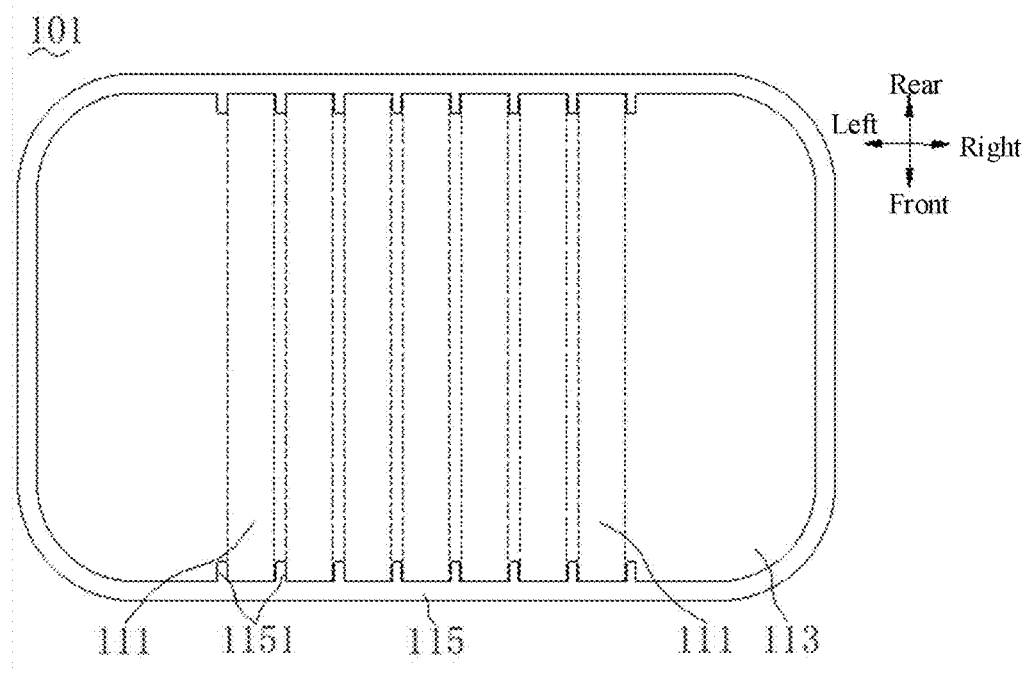
FIGS. 18 to 21 are top views of an inner side wall of a housing according to an embodiment of the present disclosure provided with a one-piece support.
Figure 19:
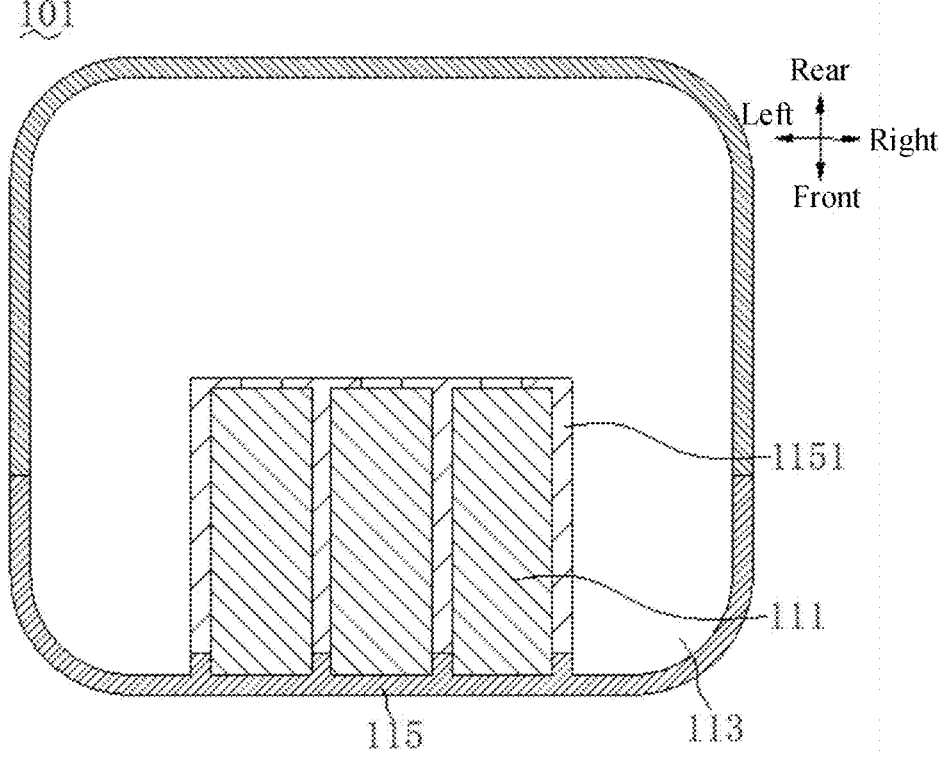

In one example, as illustrated in FIGS. 18 and 19, the second cell 103 may be of a sheet shape or a square shape and can be configured for mounting the second positioning portion 111 placed in a rectangular groove hole to ensure the stability of the second cell 103.

Figure 20:
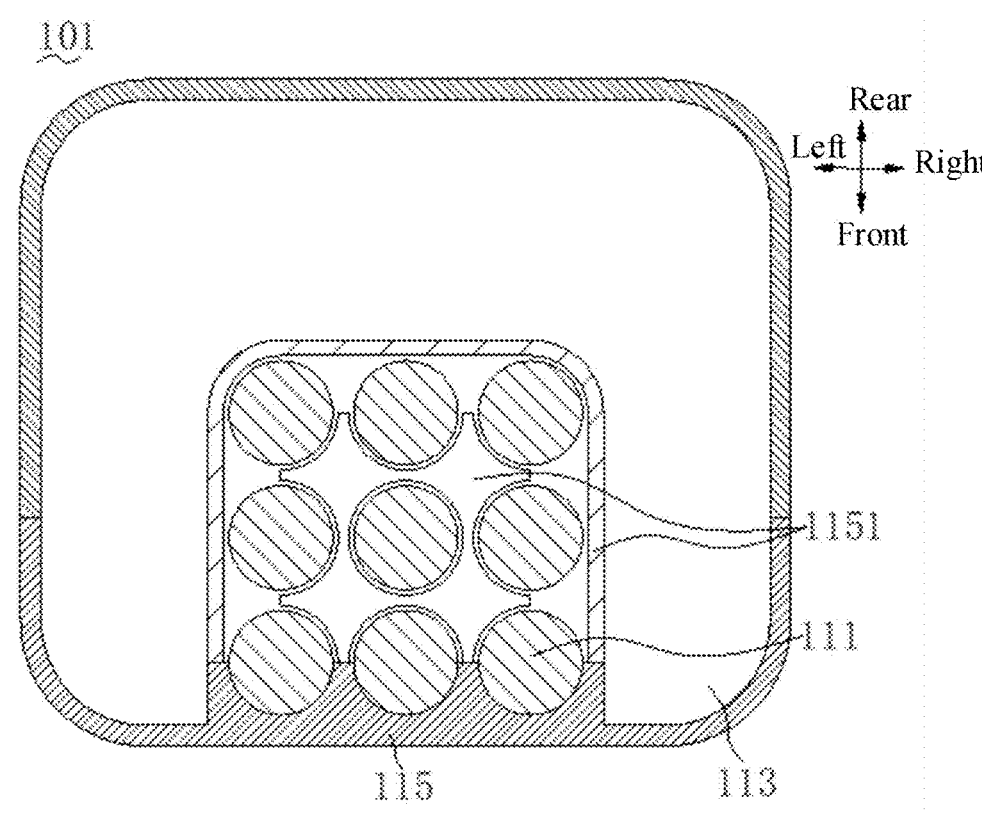

In another example, as illustrated in FIG. 20, the second cell 103 may also be in a cylindrical shape and can be configured for mounting of the second positioning portion 111 placed in a cylindrical groove hole to ensure the stability of the second cell 103.

Figure 21:
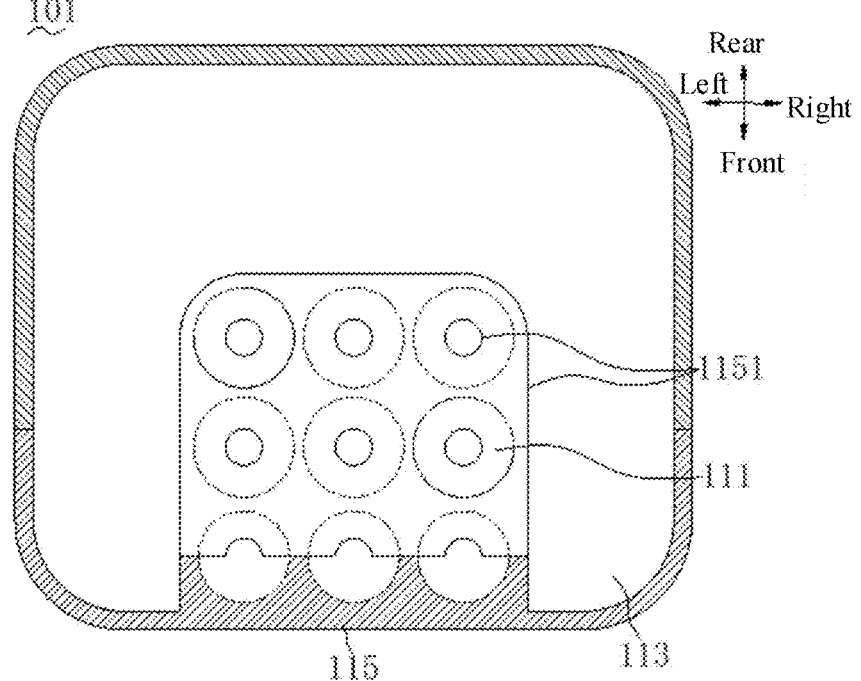

In yet another example, as illustrated in FIG. 21, the second cell 103 may also be of a hollow cylinder shape and can be configured to mounting for the second positioning portion 111 placed in a circular groove hole to ensure the stability of the second cell 103.

In other examples, the second cell 103 may also be of other shapes to match the second positioning portion 111 of the corresponding shape to ensure the stable placement of the second cell 103, without specific limitation herein.

In summary, with the second positioning portion 111 located at the inner bottom wall 113 or the inner side wall 115 of the second housing 101, it can economize on the support usage and the mounting space, thereby increasing the number of the second cells 103 placed and energy density of the second cell 103, providing great practicality.

Referring to FIG. 14, in some embodiments, a plurality of snap-fitting posts 1131 arranged in an array are provided on an inner bottom wall 113 of the second housing 101. The second positioning portion 111 is a positioning groove formed between four snap-fitting posts 1131 of the plurality of snap-fitting posts 1131, and the four snap-fitting posts 1131 are arranged in two adjacent rows and two adjacent columns of the array.

In this way, the first end 131 of the cylindrical second cell 103 is guided and fixed, providing good security.

In one embodiment, a plurality of snap-fitting posts 1131 are arranged in an array with a plurality of rows and a plurality of columns, and a positioning groove is defined between two adjacent rows and two adjacent columns of the array to ensure that the plurality of second cells 103 are placed at intervals, providing good security.

It can be understood that by arranging the positioning grooves at intervals by the plurality of snap-fitting posts 1131, the plurality of second cells 103 can be ensured to be arranged at intervals, reducing problems such as thermal expansion caused by direct contact between the plurality of second cells 103, and reducing the situation where the plurality of second cells 103 are squeezed and deformed by each other due to collision of the energy storage power supply 100. As a result, a safety risk is lowered.

In one embodiment, as illustrated in FIG. 14, a cylindrical groove hole may be defined between two adjacent rows and two adjacent columns of snap-fitting posts 1131 to ensure stable placement of the cylindrical second cell 103, thereby improving stability of the cylindrical second cell 103.

In detail, an outer peripheral wall of each snap-fitting post 1131 is constructed as a curved surface to form a cylindrical groove hole, and the cylindrical groove hole thus matches the outer peripheral wall of the second cell 103, thereby ensuring the connection effect between the second cell 103 and the second positioning portion 111 to reduce a shaking phenomenon.

In other embodiments, the positioning groove may also be of other shapes, such as a rectangular shape, to ensure the stable placement of the second cell 103 of different shapes, without specific limitation herein.

In one embodiment, as illustrated in FIGS. 11 and 14, preferably, the snap-fitting post 1131 has a height smaller than or equal to a height of the second housing 101 in FIG. 11 to ensure that the second positioning portion 111 has a height smaller than or equal to the height of the second housing 101 in FIG. 11, thereby ensuring that the second cell 103 is stably placed in the second positioning portion 111. In other embodiments, the snap-fitting post 1131 may have a height greater than a height of the second housing 101 in FIG. 11, such that the second positioning portion 111 has a height greater than the height of the second housing 101 in FIG. 11, ensuring that an electronic element (such as an inverter) arranged at the second end 132 of the second cell 103 is stably fixed inside the energy storage power supply 100 by means of other connection members, which is specifically limited herein.

The second housing 101 in FIG. 11 may be a unilateral second housing 101, such as a lower housing integrated with the second positioning portion 111, a left housing integrated with the second positioning portion 111, or a unilateral second housing 101 in other orientations, without specific limitation herein.

Referring to FIG. 16, in some embodiments, a plurality of position-limiting strips 1132 are provided on an inner bottom wall 113 of the second housing 101. Each of the plurality of position-limiting strips 1132 includes two serpentine side surfaces 1133. The second positioning portion 111 is a positioning groove formed between two adjacent serpentine side surfaces 1133.

In this way, the first end 131 of the cylindrical second cell 103 is inserted into the positioning groove, and the side surface of the cylindrical second cell 103 is closely attached to the serpentine side surface 1133, improving the stability of the cylindrical second cell 103.

In one embodiment, a plurality of position-limiting strips 1132 are arranged in a plurality of rows on an inner bottom wall 113 of the second housing 101. Each of the plurality of position-limiting strips 1132 includes two serpentine side surfaces 1133 opposite to each other to form a plurality of positioning grooves arranged at intervals in a row direction and a plurality of positioning grooves arranged offset from each other in a column direction. Thus, the plurality of second cells 103 are ensured to be placed at intervals in the second positioning portion 111, providing good security.

It can be understood that by arranging the positioning grooves at intervals through the serpentine side surface 1133, the plurality of second cells 103 can be ensured to be arranged at intervals, reducing problems such as thermal expansion caused by direct contact between the plurality of second cells 103, and reducing the situation where the plurality of second cells 103 are squeezed and deformed by each other due to collision of the energy storage power supply 100. As a result, a safety risk is lowered.

In one embodiment, as illustrated in FIG. 16, position-limiting strips 1132 may be provided in three rows in a left-right direction, and a plurality of cylindrical groove holes may be defined between two serpentine side surfaces 1133 of each of the position-limiting strips 1132 to ensure that the plurality of cylindrical second cells 103 are stably placed at safe intervals, thereby improving the stability of the plurality of cylindrical second cells 103.

In other embodiments, other numbers of position-limiting strips 1132 may also be provided, and the positioning groove may also be of other shapes, such as a rectangular shape, to ensure the stable placement of the second cells 103 of different shapes, without specific limitation herein.

Referring to FIGS. 18 to 21, in some embodiments, a one-piece support 1151 is provided on an inner sidewall 115 of the second housing 101. The second positioning portion 111 is a positioning groove formed on the one-piece support 1151.

In this way, the supports required for the cells are saved, the first end 131 of the second cell 103 is ensured to be stably fixed through the inner side wall 115 of the second housing 101, and the cost is lowered.

In one embodiment, as illustrated in FIGS. 18 to 21, a one-piece support 1151 is provided on an inner sidewall 115 of the second housing 101, enabling the inner side wall 115 and the one-piece support 1151 to form a second positioning portion 111, enabling the first end 131 of the second cell 103 to be limitedly placed in the second positioning portion 111 and supported by the inner bottom wall 113, thereby ensuring the stability of the second cell 103.

In one embodiment, the second housing 101 and the one-piece support 1151 may be integrally formed through injection molding to save the external support and the mounting space, and to improve structural strength of the second housing 101 and structural strength of the one-piece support 1151. Therefore, the second cell 103 is ensured to be safely placed.

In other embodiments, the second housing 101 and the one-piece support 1151 may also be formed in other ways to ensure that the second cell 103 is safely placed, without specific limitation herein.

In one embodiment, as illustrated in FIG. 18, the one-piece support 1151 may be formed on two opposite inner side walls 115 inside the second housing 101, to form a plurality of rectangular positioning grooves that can be configured to place the sheet-like second cell 103 or the square second cell 103, thereby ensuring the stability and the safety of the second cell 103.

In one embodiment, as illustrated in FIG. 19, the one-piece support 1151 may also be formed on a single inner side wall 115 of the second housing 101 (as shown in FIG. 19), and may also be formed on two adjacent inner side walls 115 or on three adjacent inner side walls 115 of the second housing 101 (not shown), and the one-piece support 1151 has a square shape, to form a plurality of rectangular positioning grooves that can be configured to place the sheet-like second cells 103 or the square second cells 103, thereby ensuring the stability and the safety of the second cell 103, without specific limitation herein.

In one embodiment, as illustrated in FIG. 20, the one-piece support 1151 may be formed on a single inner side wall 115 of the second housing 101 (as shown in FIG. 20), or may be formed on two adjacent inner side walls 115 or three adjacent inner side walls 115 of the second housing 101 (not shown in FIG. 20), and the one-piece support 1151 can define a plurality of cylindrical positioning grooves that can be configured to place the cylindrical second cells 103, thereby ensuring the stability and the safety of the second cell 103, without specific limitation herein.

In one embodiment, as illustrated in FIG. 21, the one-piece support 1151 may be formed on a single inner side wall 115 of the second housing 101 (as shown in FIG. 21), or may be formed on two adjacent inner side walls 115 or three adjacent inner side walls 115 of the second housing 101 (not shown in FIG.), and the one-piece support 1151 includes cylinders arranged in an array and an outer frame, which may define a plurality of circular positioning grooves that can be configured to place the hollow cylindrical second cells 103, thereby ensuring the stability and the safety of the second cells 103, without specific limitation herein.

In summary, the second housing 101 and the one-piece support 1151 are integrally formed, which can save the external support and the mounting space to ensure the stable placement of the second cell 103 and to lower the cost.

Referring to FIGS. 14 to 21, in some embodiments, the positioning groove has a circular shape or a rectangular shape.

This ensures that the cylindrical second cell 103 and the rectangular second cell 103 can be stably placed in the positioning grooves of the corresponding shapes respectively, thereby improving adaptability and the safety of the second cells 103 of different shapes.

In one embodiment, as illustrated in FIGS. 14, 16, 17, 20, and 21, the positioning groove has a circular shape and can be configured to place the cylindrical second cell 103 to ensure that the cylindrical second cell 103 is matched with and connected to the circular positioning groove, thereby improving the safety of the cylindrical second cell 103.

In another embodiment, as illustrated in FIG. 15, FIG. 18, and FIG. 19, the positioning groove has a rectangular shape and can be configured to place the sheet-like second cell 103 or the square second cell 103 to ensure that the sheet-like second cell 103 or the square second cell 103 is matched with and connected to the rectangular positioning grooves, thereby improving the security of the sheet-like second cell 103 or the square second cell 103.

It will be appreciated that, in one example, the second cell 103 may form an interference fit with the positioning groove to ensure that the second cell 103 is stably placed, thereby ensuring the safe operation of the second cell 103.

In another example, when the second cell 103 is placed in the positioning groove, the second cell 103 can be ensured to be stably connected to the positioning groove by injecting a colloid, thereby ensuring the safe operation of the second cell 103.

The colloid may be a thermal conductive adhesive, which on the one hand can strengthen a connection effect of the second cell 103, and on the other hand can also dissipate heat generated by the second cell 103 through the second housing 101 to allow for effective heat dissipation of the second cell 103, providing the good safety.

In summary, with the positioning groove having the circular shape or the rectangular shape, the cylindrical second cell 103 and the rectangular second cell 103 can be ensured to be placed stably and the adaptability of placing the second cell 103 of different shapes is improved, providing the good practicality.

In some embodiments, the second cell 103 includes one of a cylindrical cell and a sheet-like cell.

Therefore, by providing the second cell 103 in different shapes, actual needs of the user can be met.

In one embodiment, the second cell 103 includes one of a cylindrical cell and a sheet cell. That is, the energy storage power supply 100 may operate with a cylindrical cell or with a sheet-like cell to ensure the user's power demand, without specific limitation herein.

In one embodiment, the second cell 103 may be a cylindrical cell, as illustrated in FIG. 11, which may be matched to be placed in the second housing 101 provided with a plurality of cylindrical second positioning portions 111, thereby ensuring a charging and discharging process of the energy storage power supply 100.

In another embodiment, the second cell 103 may be a sheet-like cell (not shown), which may be matched to be placed in the second housing 101 provided with a plurality of rectangular second positioning portions 111, thereby ensuring the charging and discharging process of the energy storage power supply 100. The sheet-like cell may be formed by stacking a plurality of second cells 103 side by side.

For example, the sheet-like cell may be a soft-pack cell using an aluminum-plastic film or a steel-plastic film, which has advantages of a small size and large energy density of a single second cell 103. Also, when a safety hazard occurs, a shell of the soft-pack cell may release an internal stress in a form of bulging or cracking, thereby improving safety of the soft-pack cell. As illustrated in FIGS. 15, 18, and 19, the soft-packed cells each may have a width matched with a width (e.g., a left-right direction) of the second positioning portion 111 and be arranged stacked to each other in a length direction (e.g., a front-back direction). In other embodiments, the soft-pack cells each may have a width approximately half of a width of the second positioning portion 111, and therefore two rows of soft-pack cells 21 may be placed side by side inside the second positioning portion 111 while reserving a gap for accommodating the fixing colloid.

Figure 22:
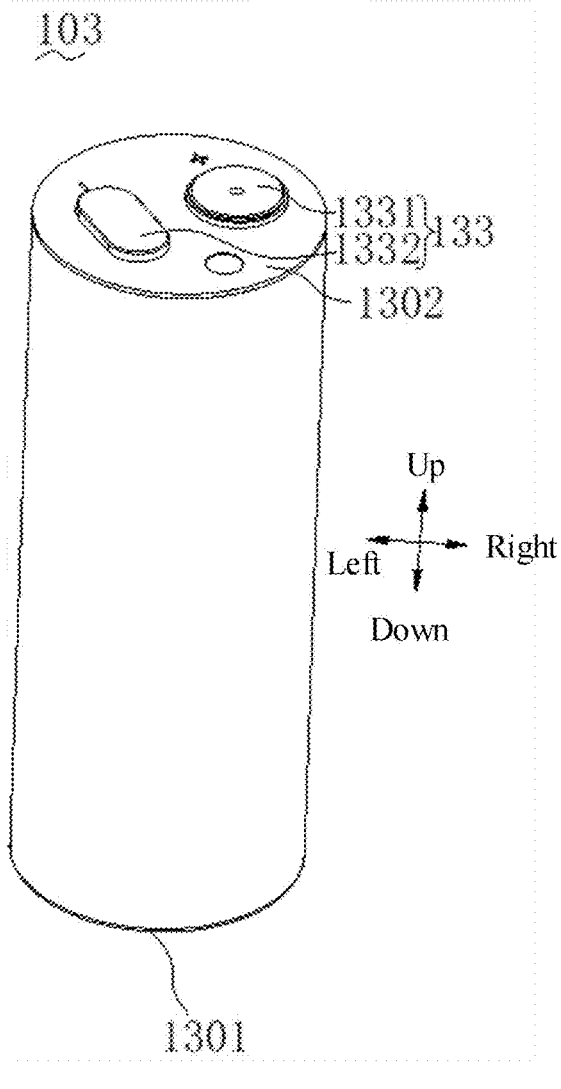
FIG. 22 is a schematic structural view of a cell according to an embodiment of the present disclosure.

Referring to FIG. 22, in some embodiments, the second cell 103 includes two electrodes 133 arranged at a second end 132 of the second cell 103.

In this way, the structure of the energy storage power supply 100 can be simplified with a reduction in welding space, which facilitates the miniaturization.

In one embodiment, as illustrated in FIGS. 11 and 22, the second cell 103 includes a first end 131 and a second end 132. The first end 131 and the second end 132 are arranged opposite to each other and are stably connected by the second positioning portion 111 and the fixing member 15 respectively, thereby ensuring the safe operation of the second cell 103.

In one embodiment, the second cell 103 includes two electrodes 133 located at the second end 132 of the second cell 103. That is, the first end 131 may be an end not provided with the electrode 133, which may be cooperatively connected to the second positioning portion 111. The second end 132 may be an end provided with the two electrodes 133, which may be cooperatively connected to the fixing member 15, the electrical connection member 17, and the collection plate 19 to ensure an input or an output of the power supply.

In one embodiment, as illustrated in FIGS. 11 and 22, each of the two electrodes 133 includes a third pole 1331 and a fourth pole 1332. The third pole 1331 may be a positive pole and the fourth pole 1332 may be a negative pole to form a positive terminal and a negative terminal of the second cell 103, ensuring the charging or the discharging of the second cell 103. In other embodiments, the third pole 1331 may also be a negative pole and the fourth pole 1332 may also be a positive pole, and no specific limitation is made herein.

That is, in one embodiment, one of the two electrodes 133 is a positive electrode and the other one of the two electrodes is a negative electrode.

In this way, it is ensured that the charging function or the discharging function can be realized on the same side of the second cell 103, and winding steps and welding steps are reduced, which helps to improve the miniaturization of the energy storage power supply 100.

It can be understood that the two electrodes 133 are located at the second end 132 of the second cell 103, that is, the two electrodes 133 are located at the same side of the second cell 103, which can reduce the arrangement of the electrical connection member 17 and the collection plate 19 and the like at the first end 131, reduce the welding steps, save the mounting space, lower the cost, and facilitate the miniaturized design of the energy storage power supply 100, and provide the good practicality.

In other embodiments, the first end 131 may also be an end provided with two electrodes 133, and the second end 132 may also be an end not provided with the electrode 133 to ensure the normal operation of the energy storage power supply 100, and no specific limitations are made herein.

In some embodiments, the two electrodes 133 are two protruding posts of different shapes or different sizes.

In this way, the positive electrode and the negative electrode of the second cell 103 can be easily distinguished based on the shapes or the sizes of the protruding posts, thereby improving accuracy of the mounting and the connection of the second cell 103 and ensuring safe use of the energy storage power supply 100.

In one embodiment, the two electrodes 133 are two protruding posts of different shapes or different sizes, allowing the two electrodes 133 to be easily distinguished to ensure correct wiring of the second cell 103, thereby satisfying the user's power supply needs for the series-connected second cell 103 or the parallel-connected second cell 103.

It can be understood that the protruding posts may be a third pole 1331 and a fourth pole 1332 of different shapes and different polarities in FIG. 22. The protruding post may have a round shape and an oval shape, thereby helping to distinguishing the wiring to ensure the safe use.

That is, the round protruding post may be a positive electrode and the oval protruding post may be a negative electrode, or the round protruding post can be a negative electrode and the oval protruding post can be a negative electrode. In other embodiments, the protruding post may also have other shapes, and no specific limitation is made herein.

In some embodiments, a protruding post is provided on the second end 132 of the second cell 103. The protruding post constitutes one of the two electrodes 133, and other parts of the second end 132 of the second cell 103 constitute the other one of the two electrodes 133.

In this way, the charging input and the discharging output at the second end 132 of the second cell 103 are realized, thereby ensuring the normal operation of the energy storage power supply 100.

In one embodiment, a protruding post is provided on the second end 132 of the second cell 103, enabling the protruding post as an electrode 133, i.e., as a terminal of the second cell 103.

In one embodiment, other parts of the second end 132 of the second cell 103 constitute the other one of the two electrodes 133, i.e., other than a region occupied by the protruding post, the other one of the two electrodes 133 may be formed in other parts of the second end 132. For example, by arranging the other protruding post or in other forms at the other parts of the second end 132 to form another terminal of the second cell 103, thereby ensuring that the functions of the charging input and the discharging output at the second end 132 of the second cell 103 are realized while reducing the welding space for arranging the second cell 103 at the two ends, which is practical.

Referring to FIG. 11, in some embodiments, the fixing member 15 includes a split-type support 151. The split-type support 151 is formed with a plurality of second positioning portions (not shown) configured to fix the second end 132. Each of the plurality of second positioning portions has a second through hole 1511 through which a corresponding protruding post passes.

In this way, the second end 132 of the second cell 103 is stably placed, thereby ensuring the overall stability of the second cell 103.

In one embodiment, as illustrated in FIG. 11, the split-type support 151 may be a removable support that may be arranged at the second end 132 of the second cell 103 and fixed to the second housing 101 by screws 152, thereby ensuring that the second cell 103 is stably arranged inside the energy storage power supply 100.

It can be understood that, as illustrated in FIG. 11, the split-type support 151 may be provided with screws 152, and the second housing 101 may have corresponding screw holes with threads, allowing the split-type support 151 to be detachably connected to the second housing 101, thereby ensuring assembly, maintenance, and replacement of the second cell 103.

In one embodiment, the split-type support 151 is formed with a plurality of second positioning portions (not shown). Each of the plurality of second positioning portions may be a blind hole that match the shape and the size of the second end 132 of the second cell 103, which may form an interference fit for fixing the second end 132 of the second cell 103 to the split-type support 151.

In one embodiment, the split-type support 151 is formed with a plurality of second through holes 1511, and each of the plurality of second through holes 1511 has a diameter smaller than a diameter of the second end 132 of the second cell 103 and may form a concentric circle arrangement with the second positioning portion (not shown), allowing the second end 132 of the second power cell 103 to abut against the second positioning portion, i.e., to abut against the split-type support 151 at a circumference of the second through hole 1511, thereby allowing for the fixing of the second end 132 of the second cell 103. Furthermore, because the first end 131 of the second cell 103 is fixed by the second positioning portion 111, the second cell 103 as a whole is ensured to be stably fixed inside the energy storage power supply 100.

In addition, with the two electrodes 133 arranged at the second end 132 of the second cell 103, the two electrodes 133 may pass through the second through hole 1511 to be welded to the electrical connection member 17, allowing the second cell 103 to be electrically connected to the electrical connection member 17, thereby ensuring the normal charging and discharging process of the second cell 103.

In one embodiment, the second through-hole 1511 may has a cylindrical shape or other shapes to ensure that the second end 132 of the second cell 103 abuts against the split-type support 151 and is fixed to the position of the second through hole 1511, without specific limitation herein.

In some embodiments, the fixing member 15 includes a fixing colloid.

In this way, the second cell 103 is stably placed inside the energy storage power supply 100, thereby ensuring the safe operation of the second cell 103.

In one embodiment, the fixing member 15 includes a fixing colloid. That is, when the first end 131 of the second cell 103 is fixed to the second positioning portion 111, the second cell 103 as a whole can be stably connected inside the energy storage power supply 100 through the fixing colloid, thereby ensuring the safe operation of the second cell 103.

It can be understood that, in one embodiment, when the first end 131 of each of the at least one second cell 103 is inserted into the second positioning portion 111, since the second cells 103 are arranged in an array by means of the second positioning portion 111, it is only necessary to inject the fixing colloid into a containing chamber 112 of the second housing 101 and direct the fixing colloid to the gaps between the plurality of second cells 103. Therefore, the second ends 132 of the plurality of second cells 103 are also ensured to be stably connected inside the energy storage power supply 100. Thus, the second cells 103 are ensured to be stably arranged as a whole to ensure the safe operation of the second cell 103.

In one embodiment, the fixing colloid may be a structural adhesive.

On the one hand, the structural adhesive can withstand relatively large loads. By injecting the structural adhesive between the gaps of the plurality of second cells 103, impact resistance of the second cells 103 can be enhanced. When the second housing 101 of the energy storage power supply 100 suffers damage that directly impacts the second cell 103, the structural adhesive can withstand a part of an impact force and meanwhile can transmit the impact force to the overall second cells 103 to reduce the impact damage.

On the other hand, the structural adhesive has good corrosion resistance. When an electrolyte leaks out of the second cells 103 due to structural damage of some of the second cells 103 or the electrolyte is ejected from an explosion-proof valve (not shown) of the second cells 103 due to thermal runaway, the structural adhesive can avoid further leakage of the electrolyte and corrosion of other second cells 103 or other structural components.

In addition, the structural adhesive can also have good thermal conductivity, and therefore to heat generated by the second cells 103 is transferred to the second positioning portion 111 and the second housing 101, which helps to lower an operating temperature of the second cells 103, thereby ensuring the safe operation of the second cells 103.

Figure 23:
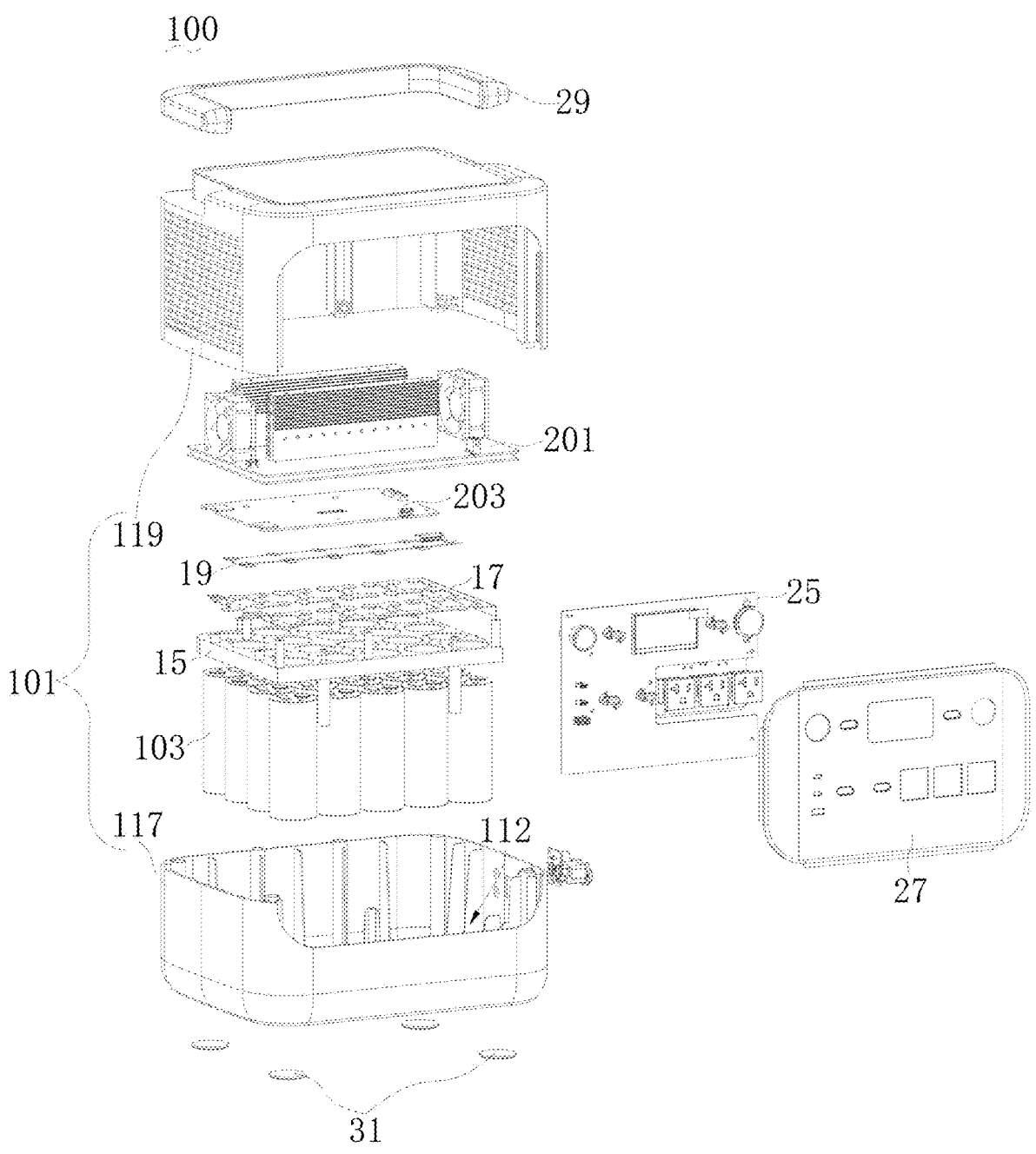
FIG. 23 is another perspective exploded schematic view of an energy storage power supply according to an embodiment of the present disclosure.

Referring to FIG. 23, in some embodiments, the second housing 101 includes a third casing 117 and a fourth casing 119. The third casing 117 is detachably connected to the fourth casing 119. The second positioning portion 111 is arranged at the third casing 117 or the fourth casing 119.

Therefore, this facilitates easier assembly and maintenance, which is practical and convenient.

In one embodiment, as illustrated in FIG. 23, the second housing 101 includes a third casing 117 and a fourth casing 119. The third casing 117 may be a lower housing and the fourth casing 119 may be an upper housing, and the third casing 117 and the fourth casing 119 are arranged opposite to each other and may be matched to be connected to each other through thread, snap-fitting, or clamp, etc., to provide a relatively stable and sealed environment, thereby ensuring that the safe and stable operation of the second cell 103 inside the energy storage power supply 100.

In some embodiments, the third casing 117 and the fourth casing 119 may also be arranged at a front part and a rear part or a left part and a right part of the second housing 101 respectively, or the third casing 117 and the fourth casing 119 are arranged at two opposite corners of the second housing 101.

It can be understood that the third casing 117 and the fourth casing 119 may be detachably connected to each other through thread, snap-fitting, or clamp, etc. The third casing 117 and the fourth casing 119 form a containing chamber 112 configured to accommodate the second cell 103. Therefore, ease of assembly or disassembly for the maintenance can be increased.

In one embodiment, the second positioning portion 111 is arranged at the third casing 117 or the fourth casing 119. It can be understood that when the third casing 117 is a lower housing, the second positioning portion 111 is arranged at the third casing 117 and may serve to fix and support the second cell 103. When the fourth casing 119 is a lower housing, the second positioning portion 111 is arranged at the fourth casing 119 and may serve to fix and support the second cell 103. When the second housing 101 is placed sideways, the second positioning portion 111 may be arranged at the third casing 117 or the fourth casing 119, both of which can ensure the fixing and the supporting of the second cell 103, thereby ensuring the normal operation of the second cell 103.

Further, referring to FIG. 23, in some embodiments, the energy storage power supply 100 may further include an inverter 201, a battery management system 203, and a main board 25 that are arranged inside the second housing 101, and a front panel 27 arranged outside the second housing 101.

The inverter 201 is arranged at the second cell 103. The inverter 201 may be electrically connected to the second cell 103 and configured to convert a direct current generated by the second cell 103 into an alternating current for use by an electrical device.

The battery management system 203 is arranged between the second cell 103 and the inverter 201 and can be configured to monitor status information of the second cell 103, such as a current, a temperature or a voltage, to avoid overcharge, overdischarge or a short circuit of the second cell 103, and thus to protect the second cell 103 from damage.

The main board 25 may be electrically connected to the second cell 103 and the inverter 201 and configured to obtain user instructions and control a charging or discharging process of the second cell 103 and a charging or discharging process of the inverter 201 through a user input port.

The front panel 27 is electrically connected to the main board 25 and can be configured to display information such as a quantity of electricity of the energy storage power supply 100 and a battery temperature. The front panel 27 may further include a port configured to connect the energy storage power supply 100 to an electrical device or a charging device to allow the second cell 103 to supply energy to the electrical device or to be charged by the charging device.

In one embodiment, the energy storage power supply 100 may further include a handle 29 and a foot pad 31.

The handle 29 is U and connected to the fourth casing 119, while the handle 29 can be folded to be accommodated in a groove formed by the fourth casing 119. As a result, the energy storage power supply 100 is easily lifted and placed, which is labor-saving and practical.

In one example, the handle 29 may be formed in one piece using a hollow aluminum material to reduce the weight of the energy storage power supply 100 while ensuring the support strength.

In one embodiment, a plurality of foot pads 31 may be provided at a bottom of the third casing 117 and can be configured to increase a friction force at the bottom of the energy storage power supply 100, avoiding collision or falling of the energy storage power supply 100 due to accidentally sliding of the energy storage power supply 100 to improve the safety of the energy storage power supply 100.

In one example, the foot pad 31 may be made of plastic to reduce the cost while ensuring the friction force.

Referring to FIG. 11, in some embodiments, the second positioning portion 111 and the second housing 101 are integrally formed.

In this way, continuity and structural strength between the second positioning portion 111 and the second housing 101 are improved, thereby ensuring the safety and the stability of the energy storage power supply 100.

In one embodiment, the second positioning portion 111 and the second housing 101 are integrally formed, which may improve stability of the connection between the second positioning portion 111 and the second housing 101 to enable better support strength of the second housing 101. Therefore, the second positioning portion 111 is ensured to be stably connected to the first end 131 of the second cell 103. Thus, the safety of the second cell 103 is ensured.

In one embodiment, the second positioning portion 111 and the second housing 101 may be integrally formed through injection molding, or may be integrally formed by other processes to ensure that the second positioning portion 111 and the second housing 101 are integrally formed, thereby reducing the use and the arrangement space of the support, and no specific limitations are made herein.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be defined by the claims as appended and their equivalents.

What is claimed is:

1. An energy storage power supply, comprising:
   a housing comprising a first casing and a second casing, wherein the first casing and the second casing are detachably connected to each other and define a receiving chamber, and wherein the first casing has a positioning portion formed on an inner wall of the first casing and comprising a plurality of cylindrical recess holes;
   a plurality of cylindrical cells arranged in the receiving chamber, each of the plurality of cylindrical cells having a first end and a second end opposite to the first end, wherein each of the plurality of cylindrical cells has comprising two electrodes located at the second end of the cylindrical cell, and wherein the first end of each of the plurality of cylindrical cells is inserted in a corresponding cylindrical recess hole of the plurality of cylindrical recess holes of the positioning portion;
   a fixing member configured to fix the second end of each of the plurality of cylindrical cells, wherein the fixing member has a plurality of through holes, the plurality of through holes positionally corresponding to the electrodes of the plurality of cylindrical cells and corresponding the second ends of the plurality of cylindrical cells in one-to-one correspondence;
   busbars located at the same side of the plurality of cylindrical cells and electrically connected to the two electrodes to allow the plurality of first cells to be connected in parallel and/or in series;
   a panel disposed on the housing, wherein the panel is configured to display a quantity of electricity of the energy storage power supply; and
   a port disposed on the panel, wherein the port is configured to connect the energy storage power supply to an electrical device or a charging device.

2. The energy storage power supply according to claim 1, wherein one of the two electrodes is a positive electrode, and the other one of the two electrodes is a negative electrode.

3. The energy storage power supply according to claim 1, wherein:
   a plurality of snap-fitting posts is arranged in an array and arranged on an inner bottom wall of the first casing; and
   each of the plurality of cylindrical recess holes of the positioning portion is formed by four snap-fitting posts of the plurality of snap-fitting posts, the four snap-fitting posts being arranged in two adjacent rows and two adjacent columns of the array.

4. The energy storage power supply according to claim 1, wherein:

a plurality of position-limiting strips is provided on an inner bottom wall of the first casing, each of the plurality of position-limiting strips comprising two serpentine side surfaces; and the plurality of cylindrical recess holes of the positioning portion are formed between two adjacent serpentine side surfaces.

5. The energy storage power supply according to claim 1, wherein:

a one-piece support is disposed on an inner side wall of the first casing; and the plurality of cylindrical recess holes of the positioning portion are positioning grooves formed on the one-piece support.

6. The energy storage power supply according to claim 1, wherein the fixing member comprises a split-type support, the split-type support being formed with a plurality of second positioning portions configured to fix the second end, each of the plurality of second positioning portions having a through hole through which a corresponding electrode of the two electrodes passes.

7. The energy storage power supply according to claim 1, wherein the positioning portion and the housing are integrally formed.

* * * * *